US010887157B1

(12) United States Patent
Fletcher et al.

(10) Patent No.: US 10,887,157 B1
(45) Date of Patent: Jan. 5, 2021

(54) DUAL-SOURCED INCIDENT MANAGEMENT AND MONITORING SYSTEM

(71) Applicant: Splunk Inc., San Francisco, CA (US)

(72) Inventors: Tristan Antonio Fletcher, Pleasant Hill, CA (US); Caleb Eugene Hanson, Louisville, CO (US); Amy Katherine Hunnel Bianchi, San Francisco, CA (US); Daniel M. Jones, Niwot, CO (US); Alexandros Nikolaos Kompotis, San Francisco, CA (US); Ross Andrew Lazerowitz, San Francisco, CA (US); William Marcum, Louisville, CO (US); Michael Margulis, Danville, CA (US); Sean David McBride, Longmont, CO (US); Daniel Blake Partain, Longmont, CO (US); Eric Nathaniel Tschetter, Redwood City, CA (US); Dipti Prabhakar Siddamsettiwar, Mountain View, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

(21) Appl. No.: 16/528,253

(22) Filed: Jul. 31, 2019

(51) Int. Cl.
*H04L 12/24* (2006.01)
*G06F 11/07* (2006.01)

(52) U.S. Cl.
CPC ...... *H04L 41/0622* (2013.01); *G06F 11/0709* (2013.01); *H04L 41/0613* (2013.01); *H04L 41/22* (2013.01)

(58) Field of Classification Search
CPC . H04L 41/0622; H04L 41/0613; H04L 41/22; G06F 11/0709
See application file for complete search history.

(56) References Cited

U.S. PATENT DOCUMENTS

| | | | |
|---|---|---|---|
| 2006/0129518 A1* | 6/2006 | Andreev | G06F 8/24 |
| 2008/0060071 A1 | 3/2008 | Hennan et al. | |
| 2010/0318846 A1 | 12/2010 | Sailer et al. | |
| 2013/0030875 A1* | 1/2013 | Lee | G06Q 30/0267 |
| | | | 705/7.38 |
| 2013/0138396 A1* | 5/2013 | Hauffen | G06Q 10/06 |
| | | | 702/181 |

(Continued)

OTHER PUBLICATIONS

Splunk Inc., "Mobile Device Composite Interface for Dual-Sourced Incident Management and Monitoring System," U.S. Appl. No. 16/528,211, including its prosecution history.

*Primary Examiner* — Kim T Nguyen
(74) *Attorney, Agent, or Firm* — Perkins Coie LLP

(57) ABSTRACT

An application executing on a mobile computing platform provides independent data channels over a mobile network to multiple separate computing systems that each maintain some data pertinent to problem determination and resolution when an incident arises in a monitored information technology (IT) environment. The application maintains and separately exercises the channels to provide timely information in a user interface that composites data to present a single interface with a multi-sourced contextual rendering. Some systems may include an IT monitoring system and a separate incident management system among its sources. Channels may include extended functionality to improve security or other aspects of communication with mobile platforms.

30 Claims, 35 Drawing Sheets

(56) References Cited

U.S. PATENT DOCUMENTS

| | | |
|---|---|---|
| 2017/0019487 A1 | 1/2017 | Maheshwari et al. |
| 2017/0052814 A1 | 2/2017 | Aguiar et al. |
| 2017/0148241 A1 | 5/2017 | Kerning et al. |
| 2019/0266064 A1 | 8/2019 | Srinivasan et al. |

* cited by examiner

| Time 535 | Host 536 | Source 537 | Source Type 538 | Event 539 |
|---|---|---|---|---|
| 531 — 10/10/2000 1:55 p.m. | www1 | access.log | access_combined | 540 541 542 643<br>127.0.0.1 - frank [10/Oct/2000:13:55:36 -0700] "GET /apache.gif HTTP/1.0" 200 2326 0.0947 ◄<br>545 545 |
| 532 — 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899<br>546 |
| 533 — 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 534 — 10/10/2000 1:58 p.m. | www2 | error.log | apache_error | [Sunday Oct 10 1:59:33 2010] [error] [client 127,10.1.1.015] File does not exist: /home/reba/public_html/images/daffy_duck.gif |

| Data Summary | | | | × |
|---|---|---|---|---|
| Hosts (5) | Sources (6) | Sourcetypes (3) | | |
| filter | | | | |
| Host ◊ | ⋅⋅⋅ | Count ◊ | Last Update ◊ | |
| mailsv | ⋅⋅⋅ ∨ | 9,829 | 4/29/14 1:32:47.000 PM | |
| vendor_sales | ⋅⋅⋅ ∨ | 30,244 | 4/29/14 1:32:46.000 PM | |
| www1 | ⋅⋅⋅ ∨ | 24,221 | 4/29/14 1:32:44.000 PM | |
| www2 | ⋅⋅⋅ ∨ | 22,595 | 4/29/14 1:32:47.000 PM | |
| www3 | ⋅⋅⋅ ∨ | 22,975 | 4/29/14 1:32:45.000 PM | |

FIG. 8B

Original Search: ⟵1602
Search "error" | stats count BY host

Sent to peers: ⟵1604
Search "error" | prestats count BY host

Executed by search head: ⟵1606
Aggregate the prestats results received from peers

FIG. 16

DUAL-SOURCED INCIDENT MANAGEMENT AND MONITORING SYSTEM

CROSS REFERENCE TO RELATED APPLICATIONS

[Reserved]

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIG. 16 is an example search query received from a client and executed by search peers, in accordance with example embodiments;

DETAILED DESCRIPTION

1.0. General Overview

Figure 1:
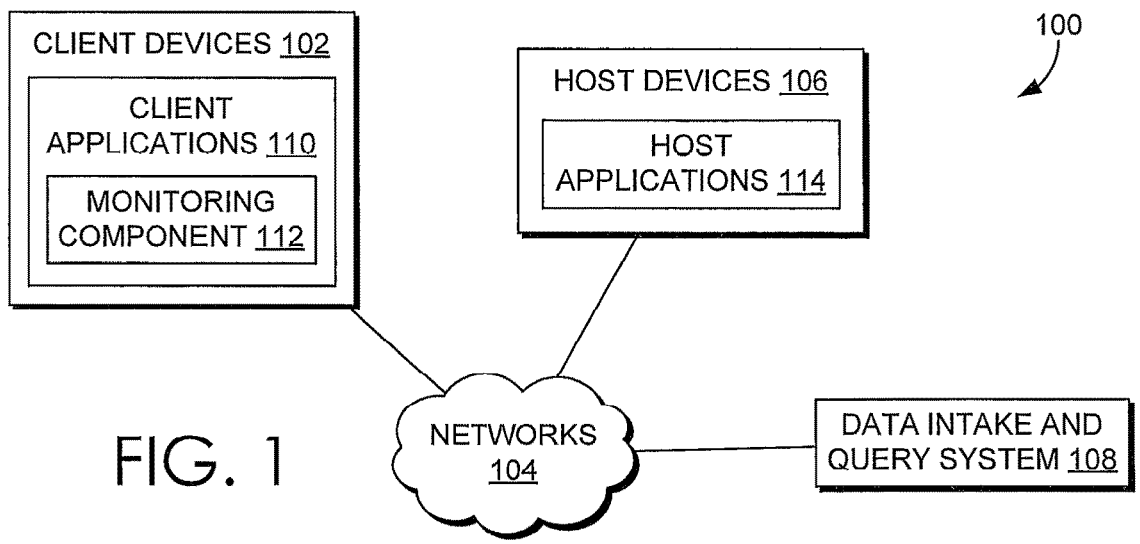
FIG. 1 is a block diagram of an example networked computer environment, in accordance with example embodiments.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
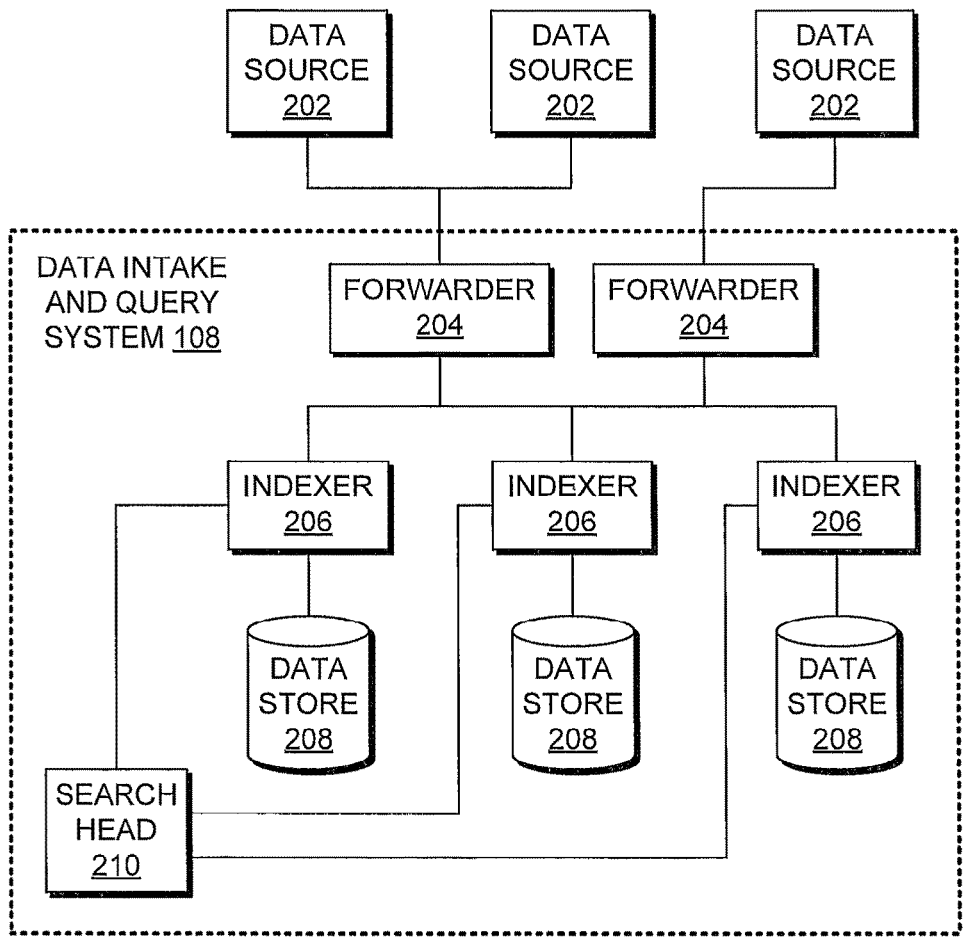
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
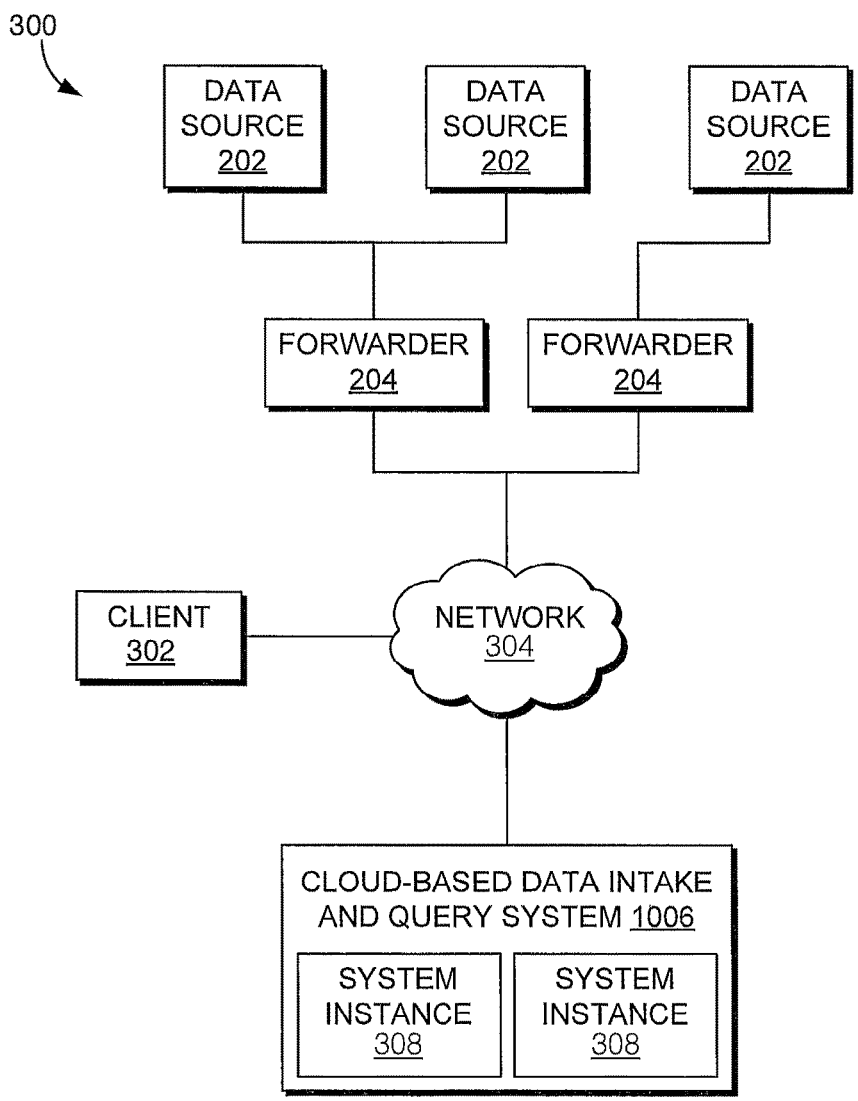
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
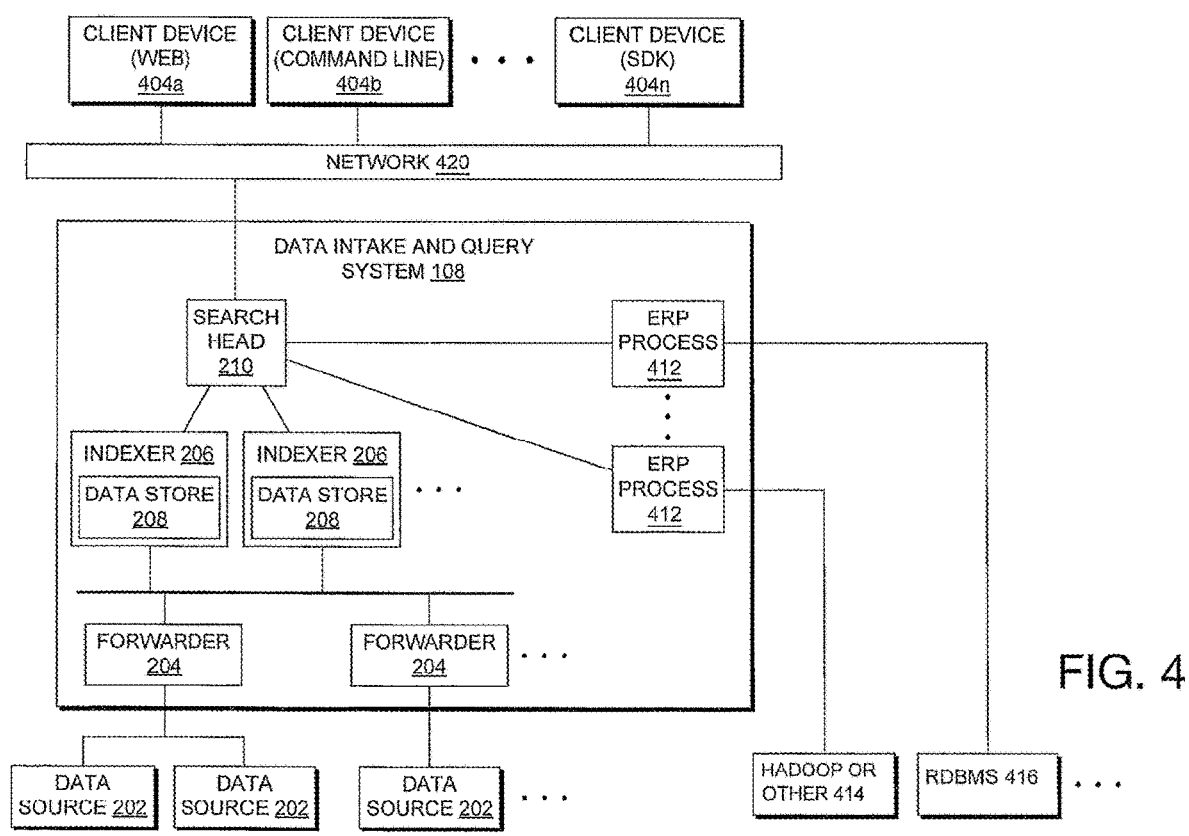
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection. Indexers here, as elsewhere, may include functionality for processing multiple data types, such as events and metrics data types discussed in reference to Indexer 436 of FIG. 18.

If the request parameters of the received search request reference an external data collection, which is not accessible to the indexers 206 of FIG. 4 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
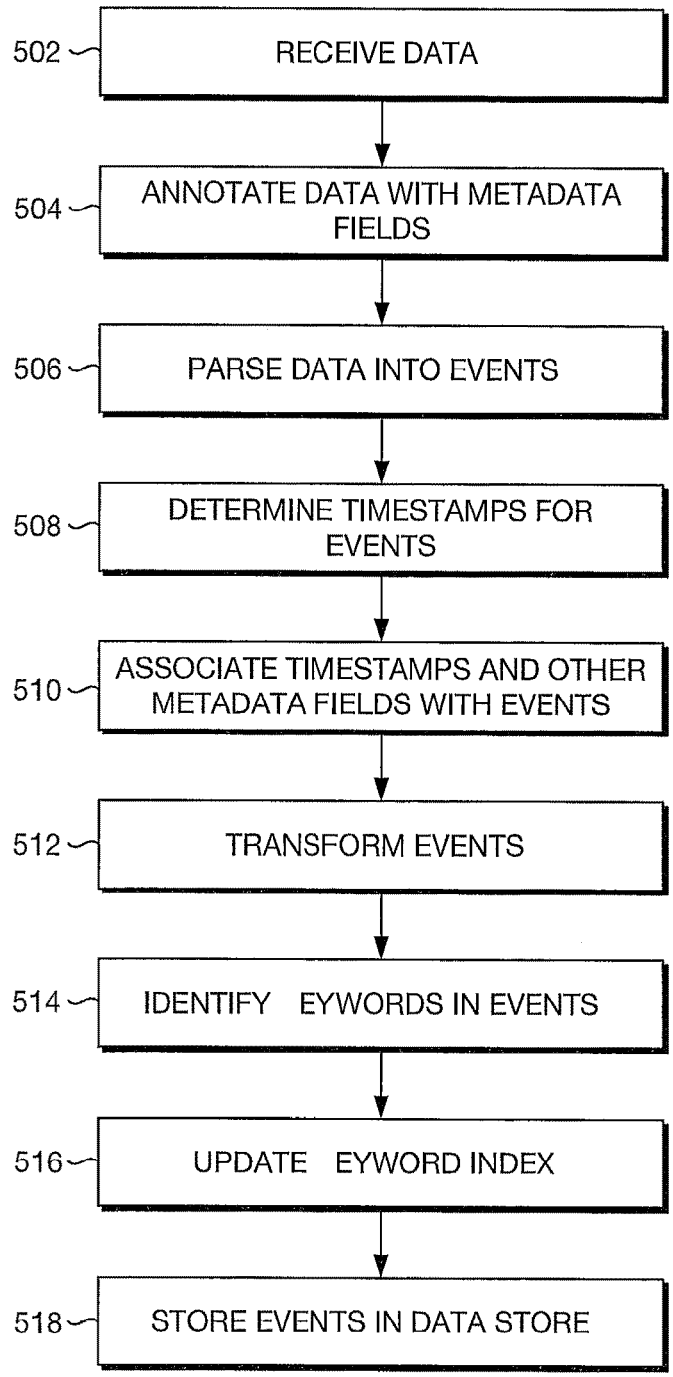
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
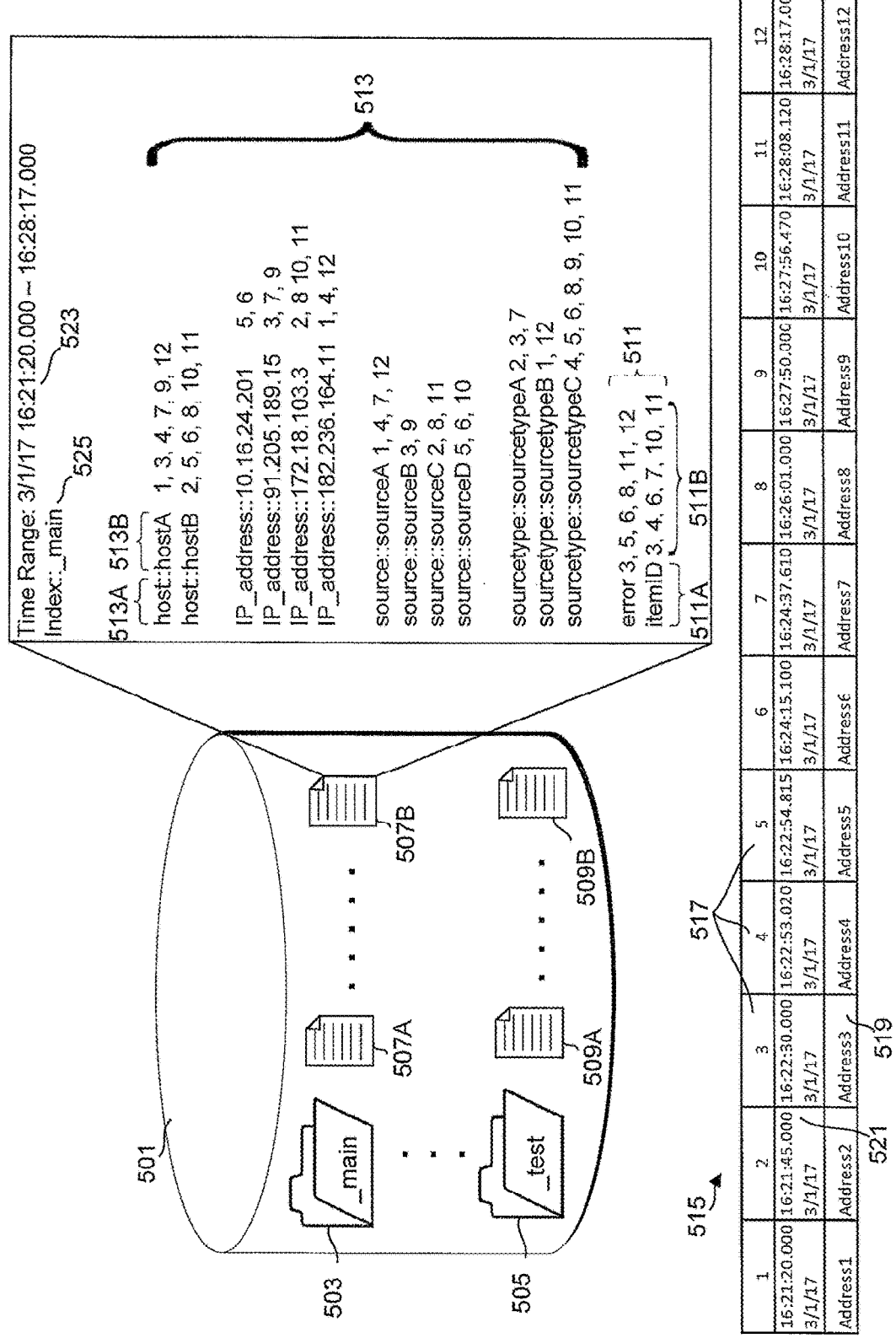
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP address as a field in each event and add the IP address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
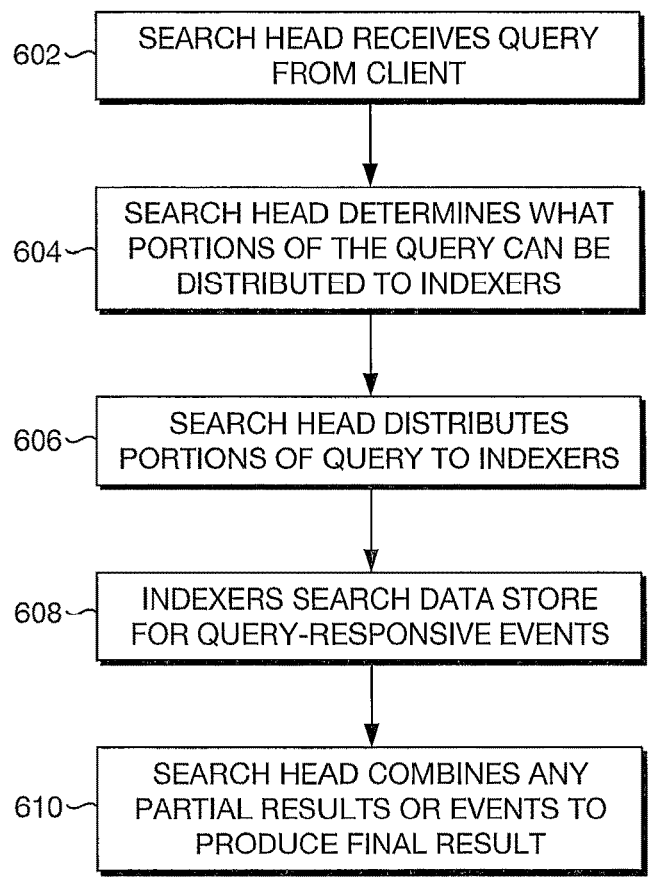
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
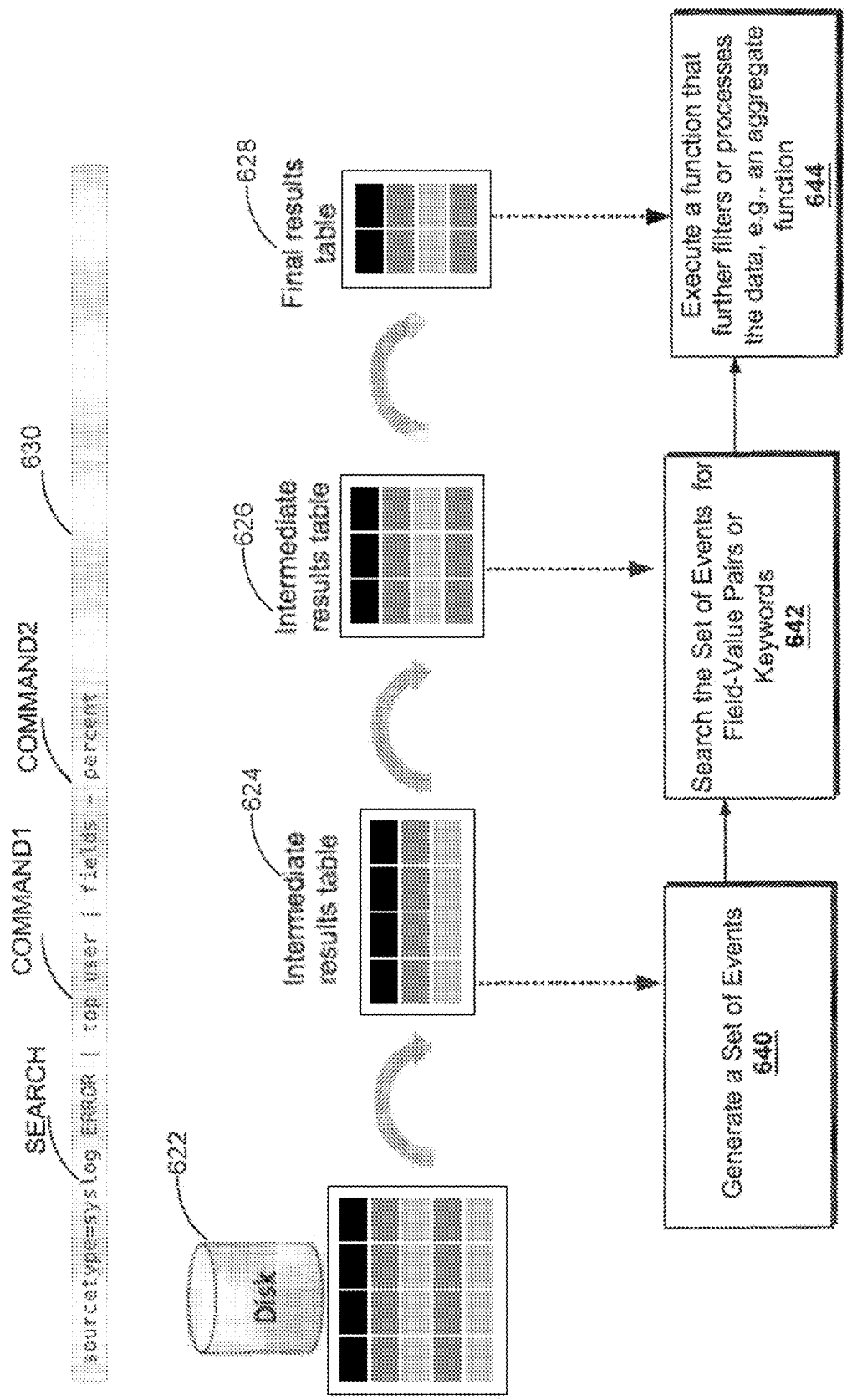
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
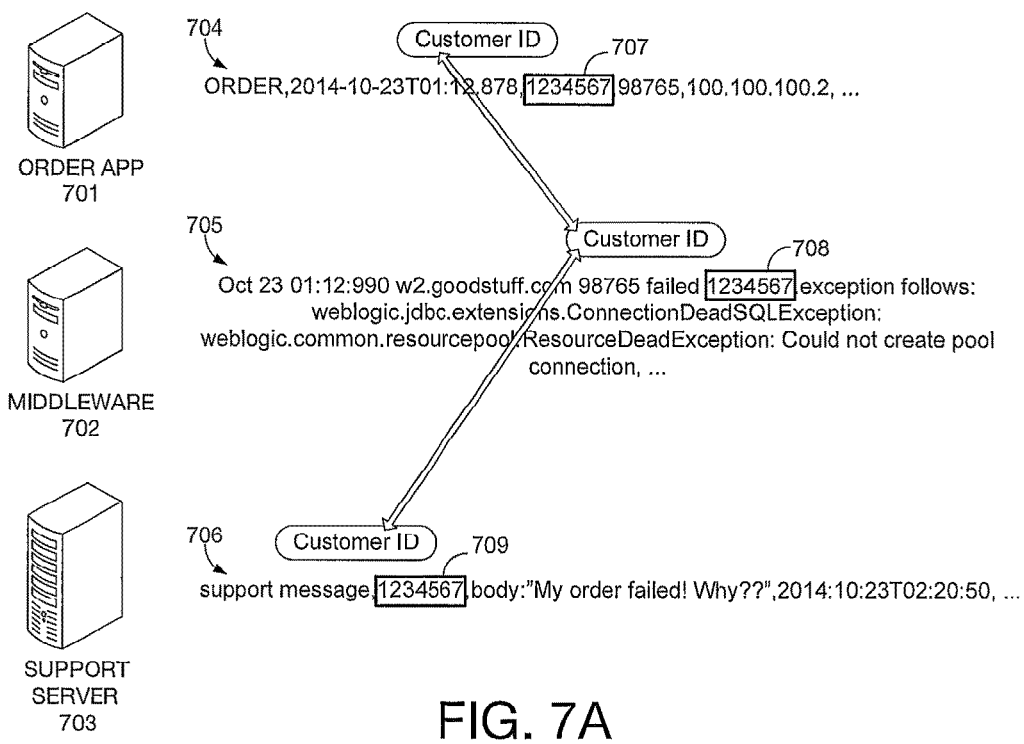
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
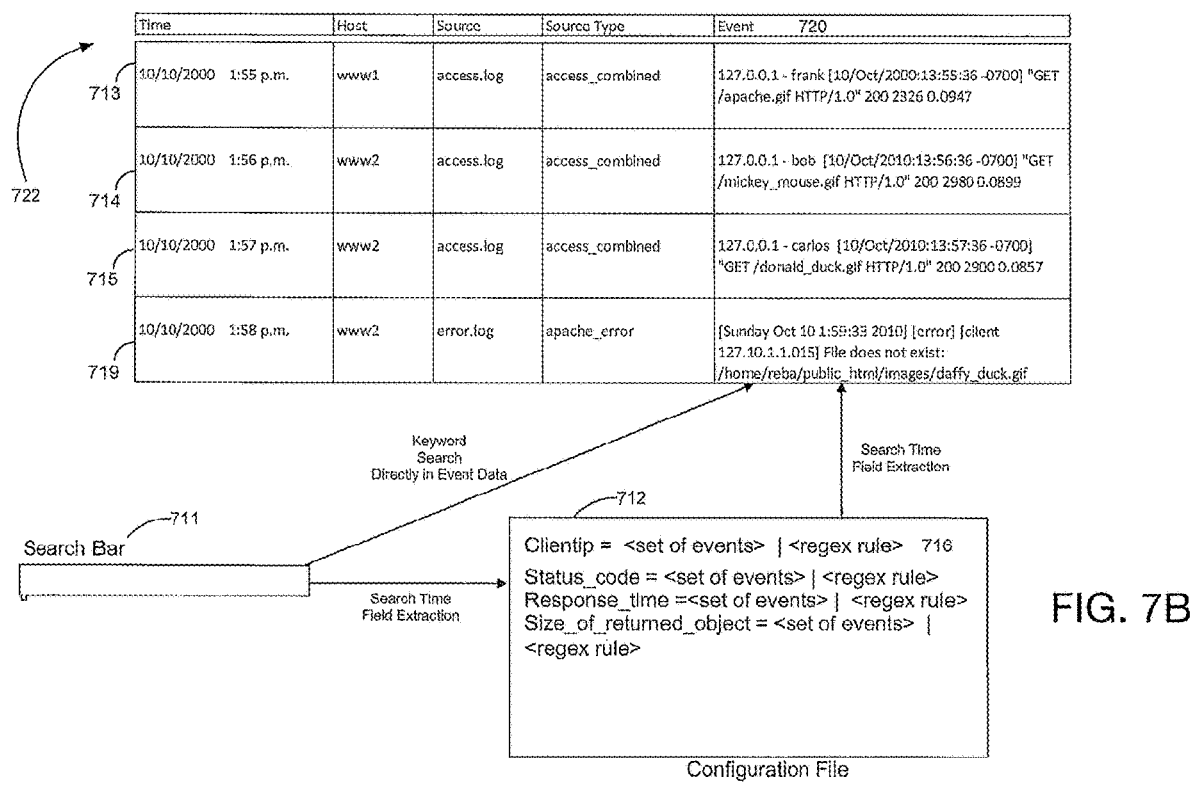
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP_addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov. 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
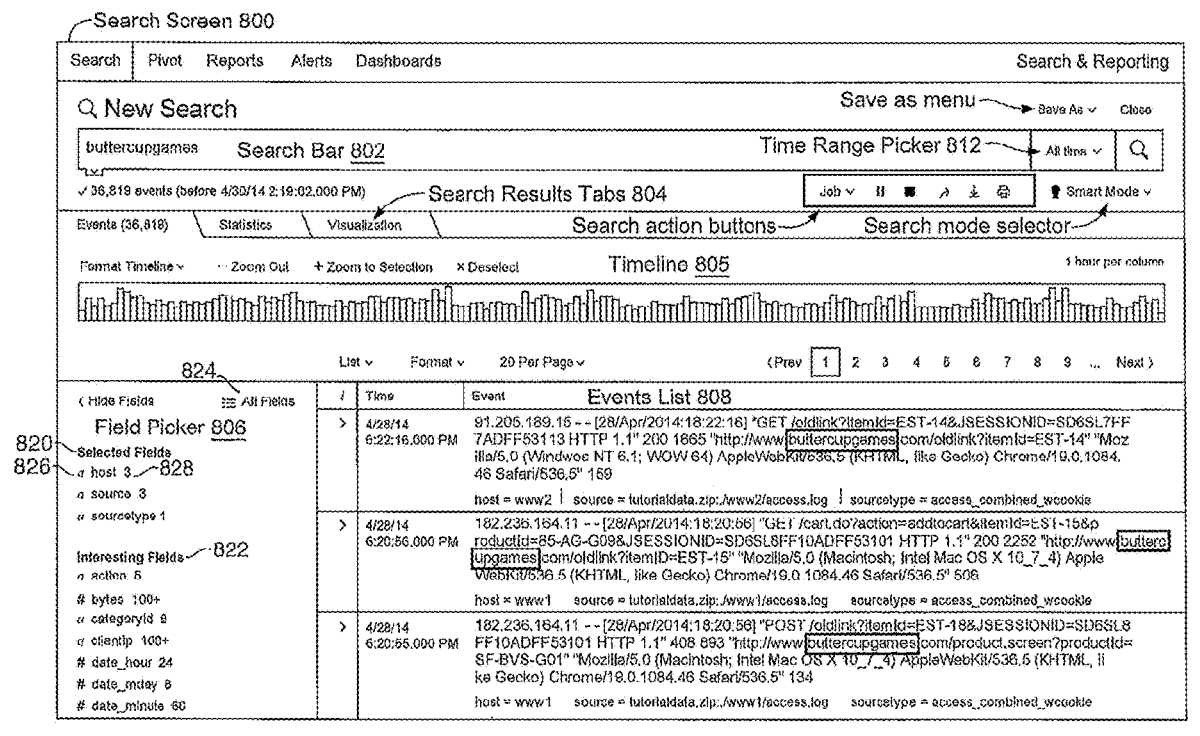

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's contraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
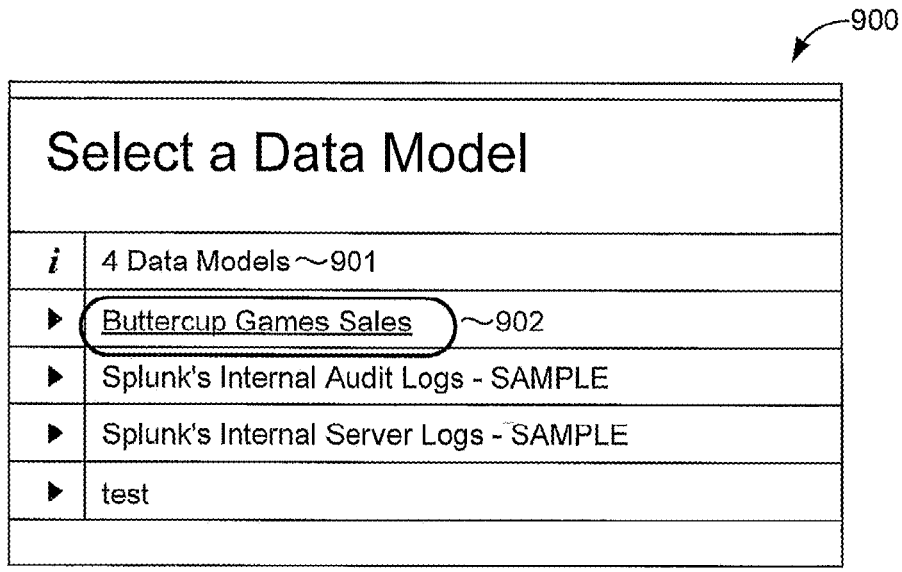
FIGS. 9-15 are interface diagrams of example report generation user interfaces, in accordance with example embodiments.

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
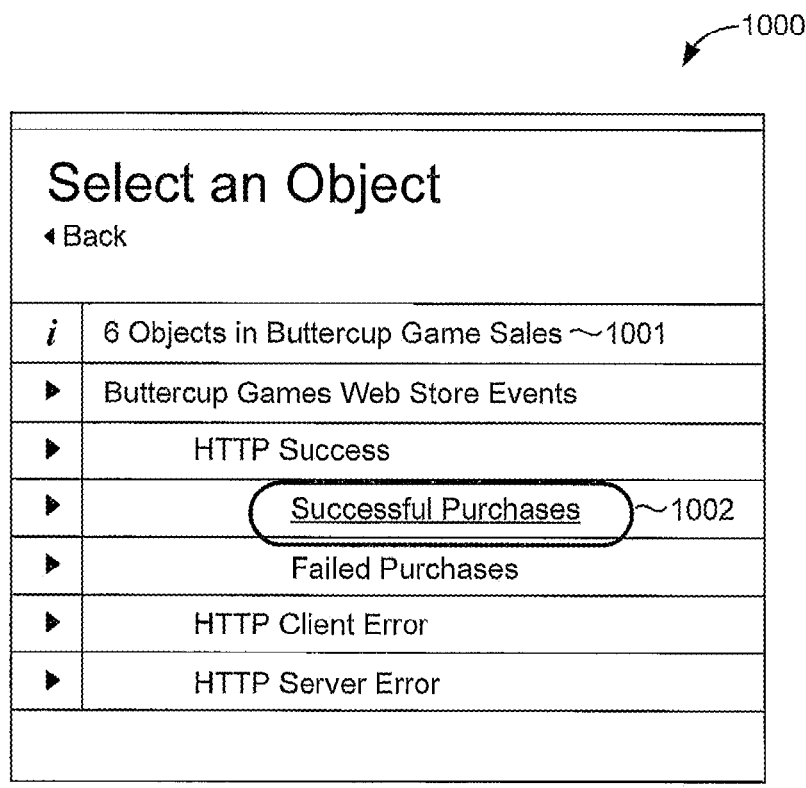

FIG. 10 illustrates an example data model object selection graphical user interface 1000 that displays available data objects 1001 for the selected data object model 902. The user may select one of the displayed data model objects 1002 for use in driving the report generation process.

Figure 11A:
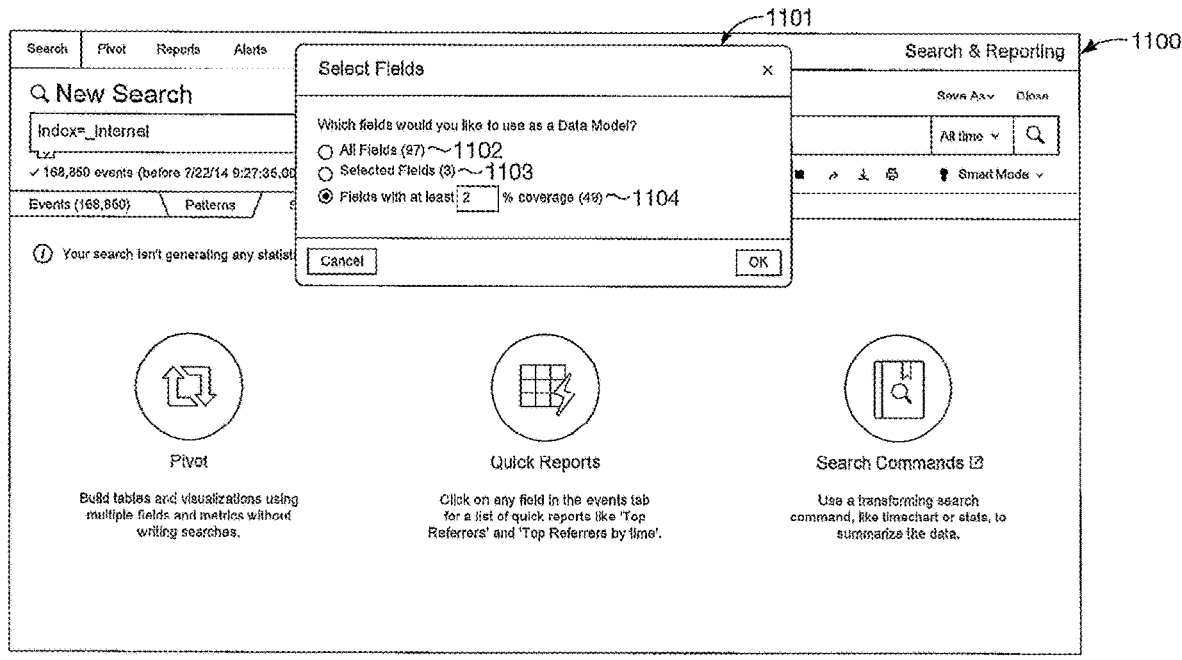

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
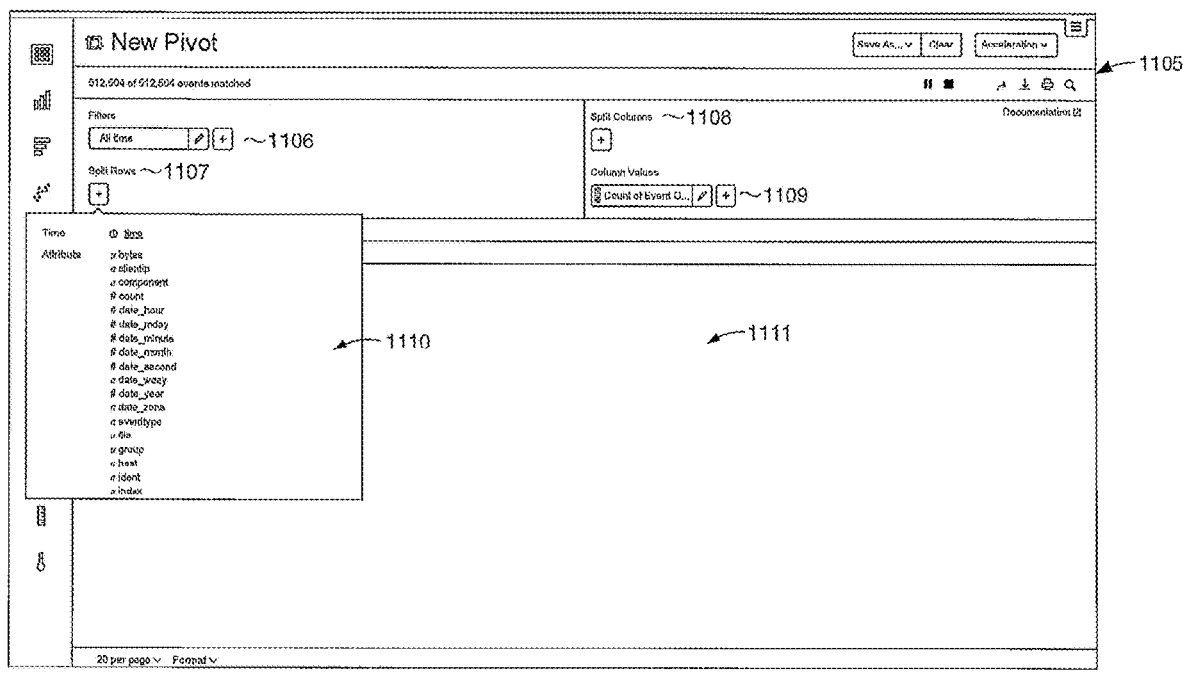
Figure 11C:
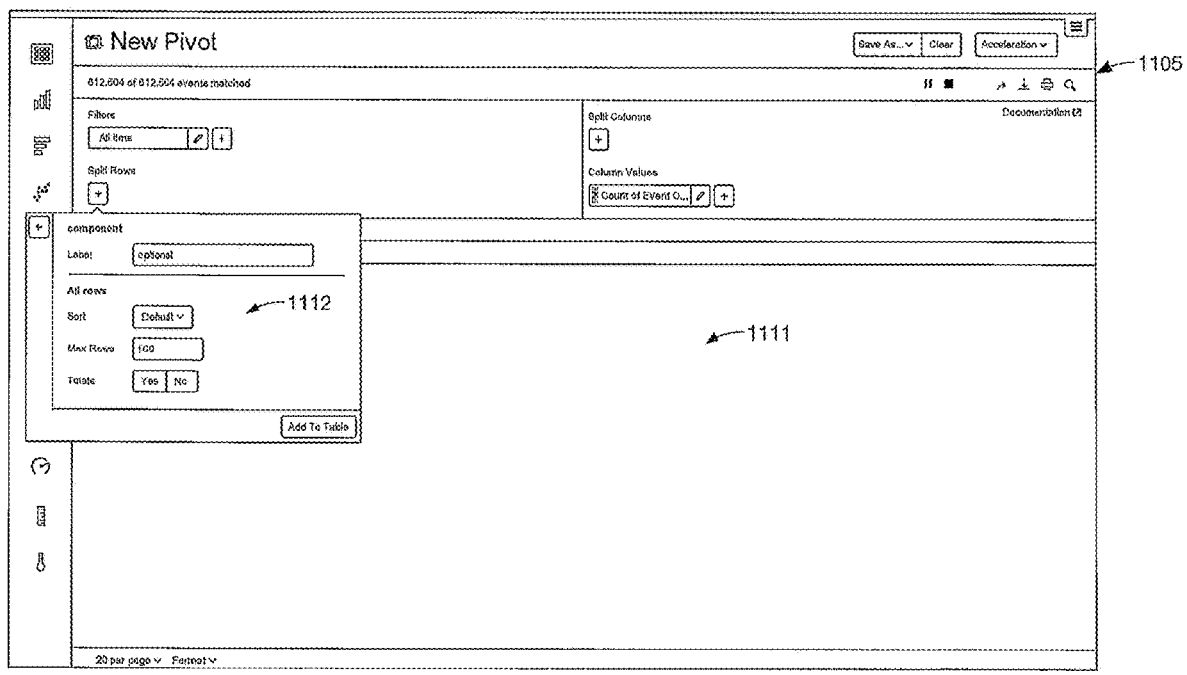

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
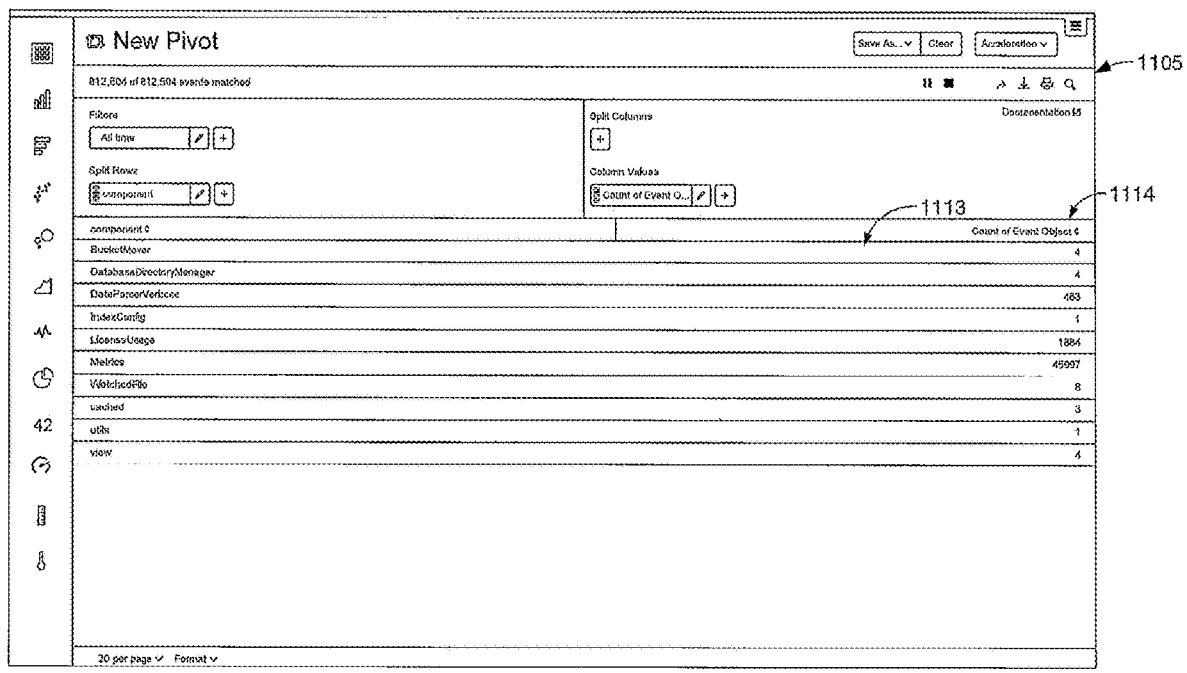

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
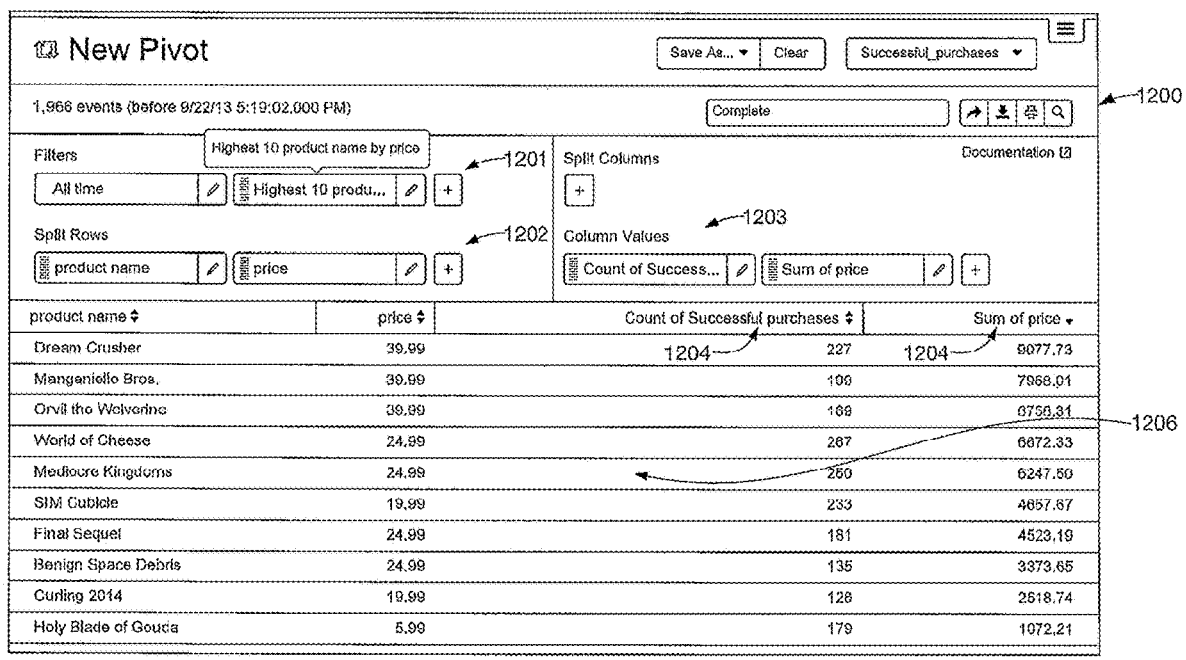

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
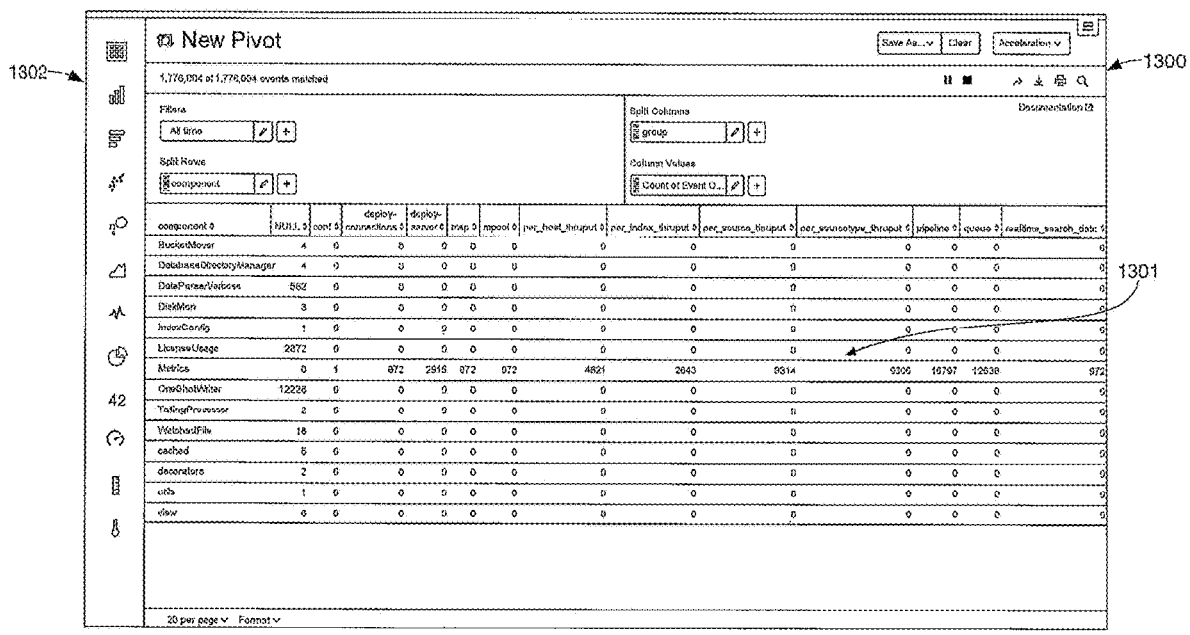
Figure 14:
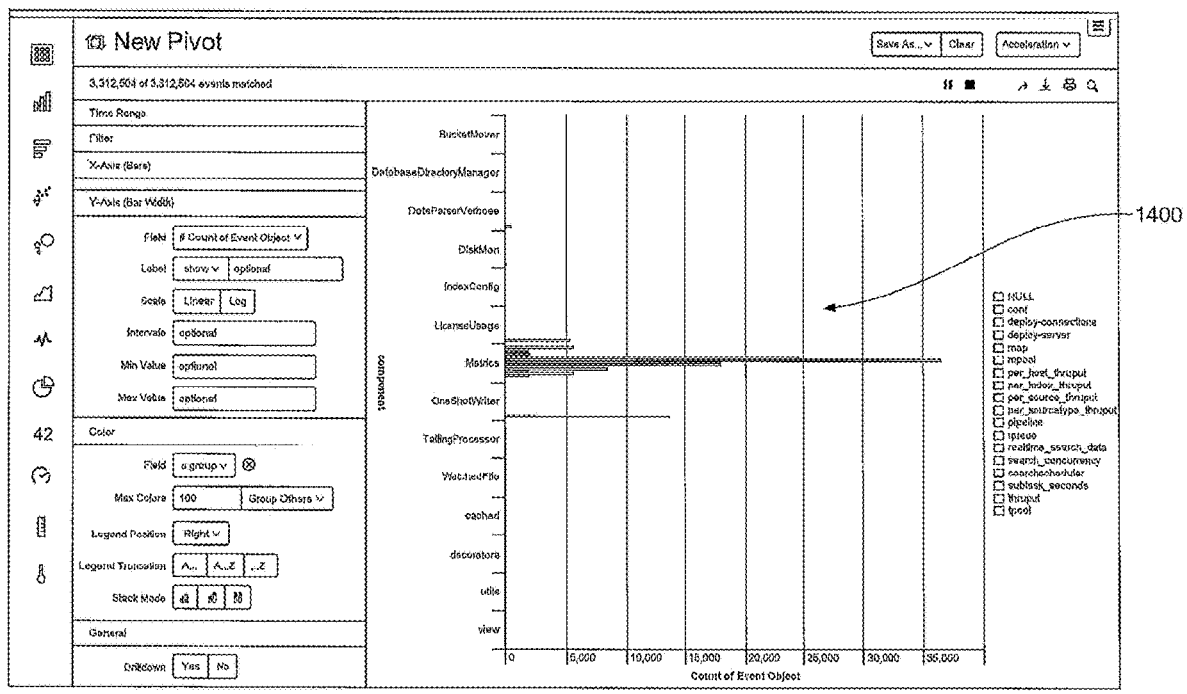
Figure 15:
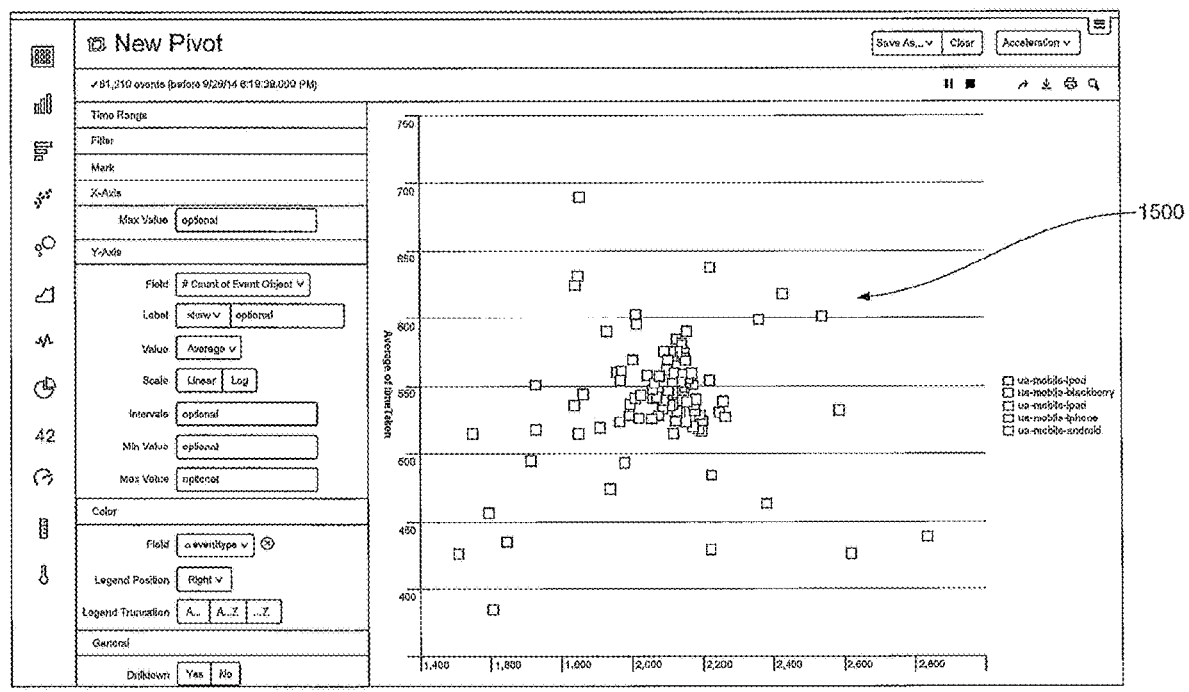

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordinace with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-know compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searachable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
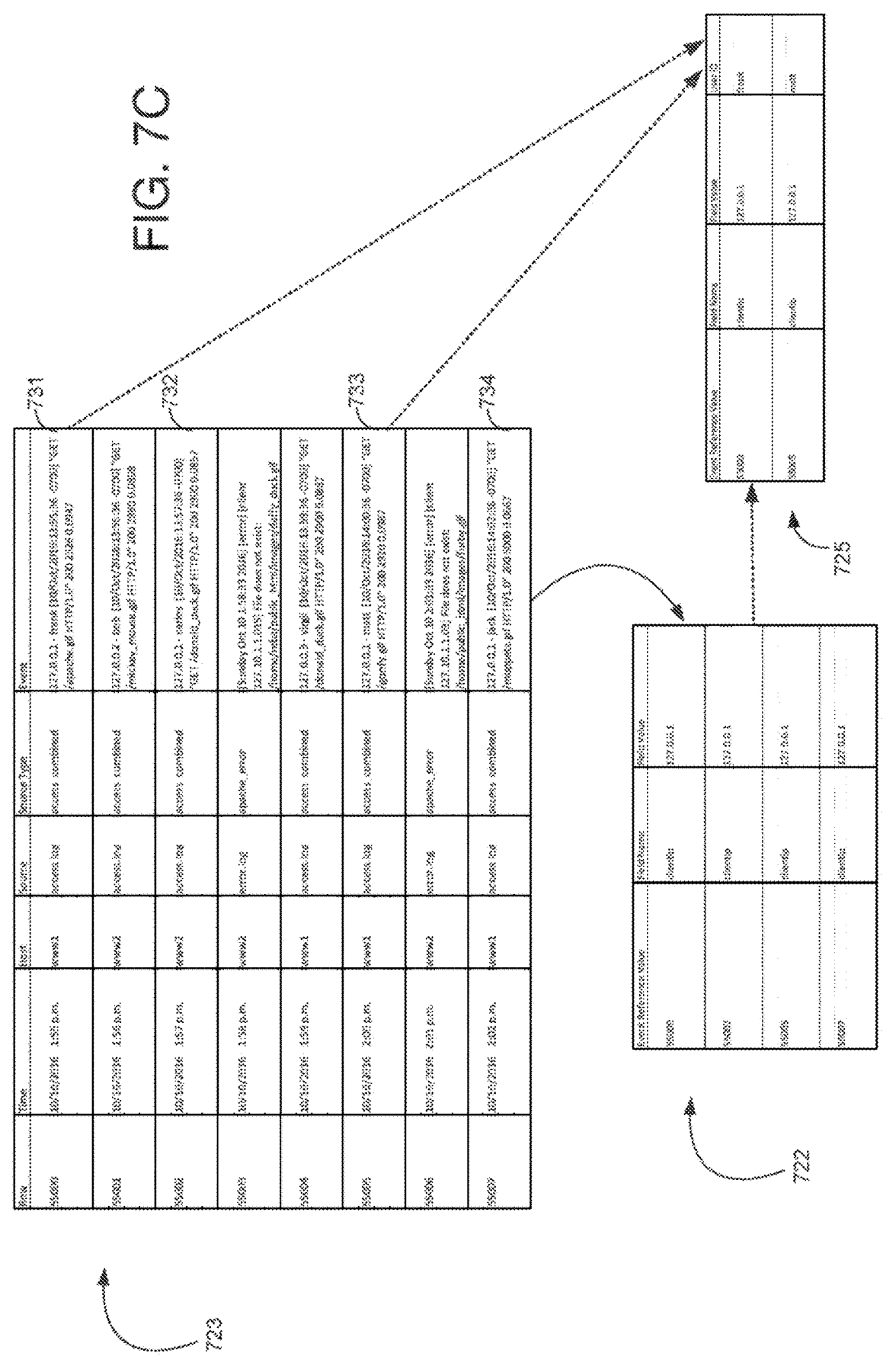

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in invertex index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP_address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP_address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682, 925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
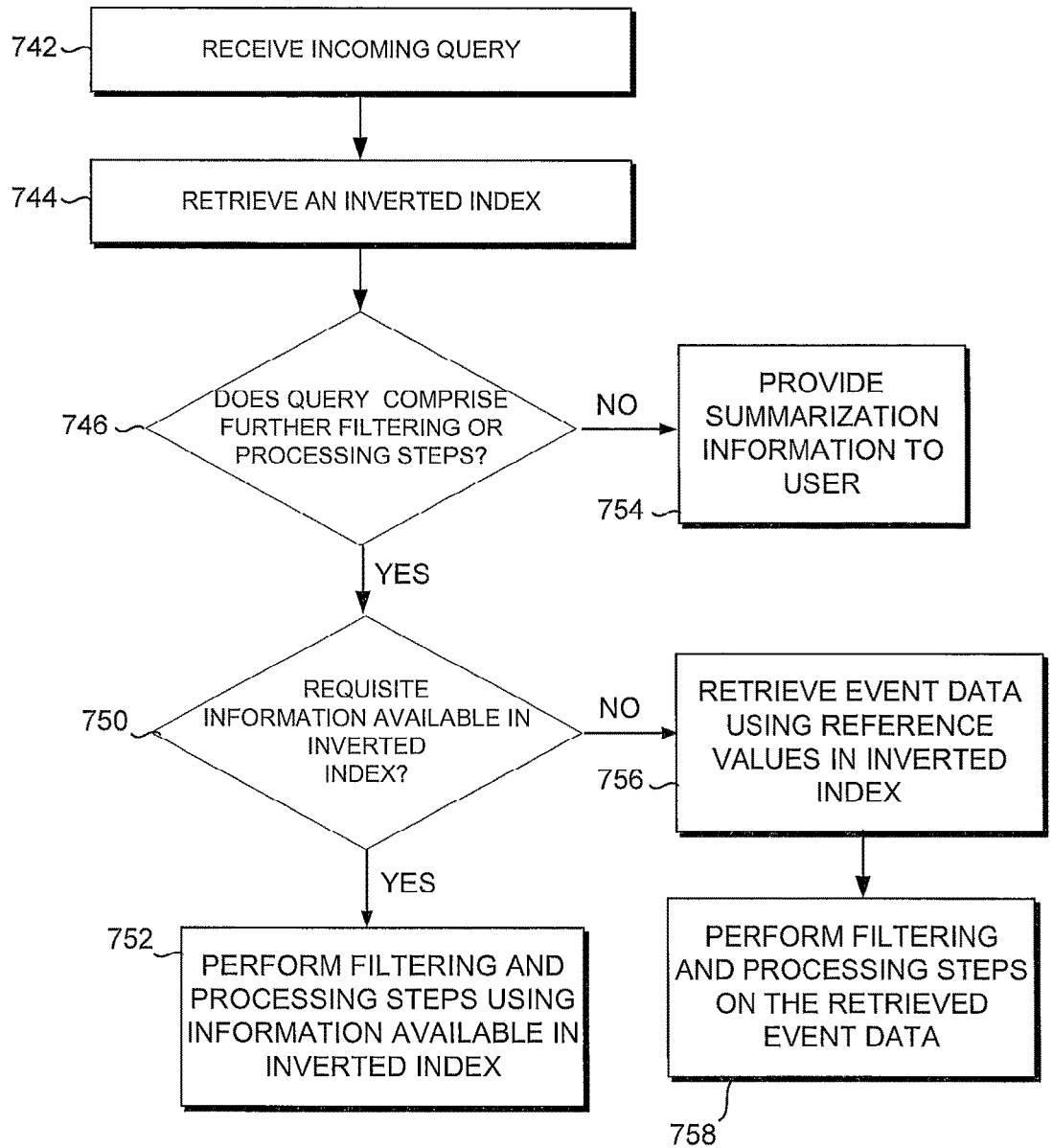
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be receive as a user generated query entered into into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOUR- NALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
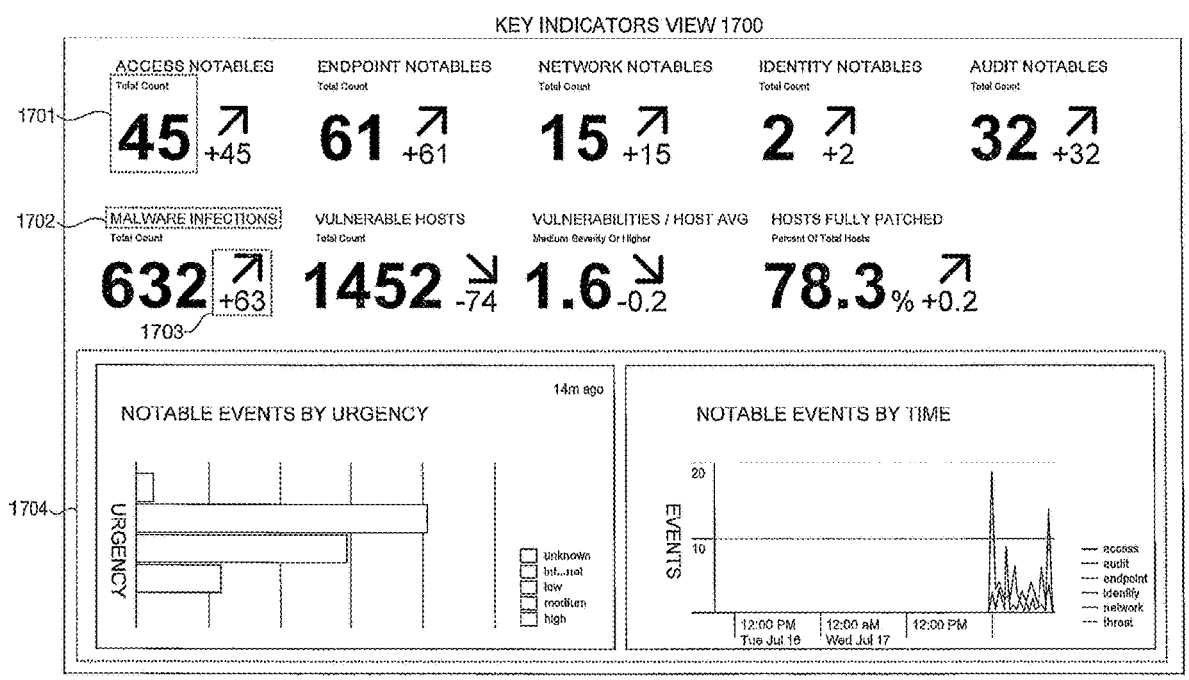
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
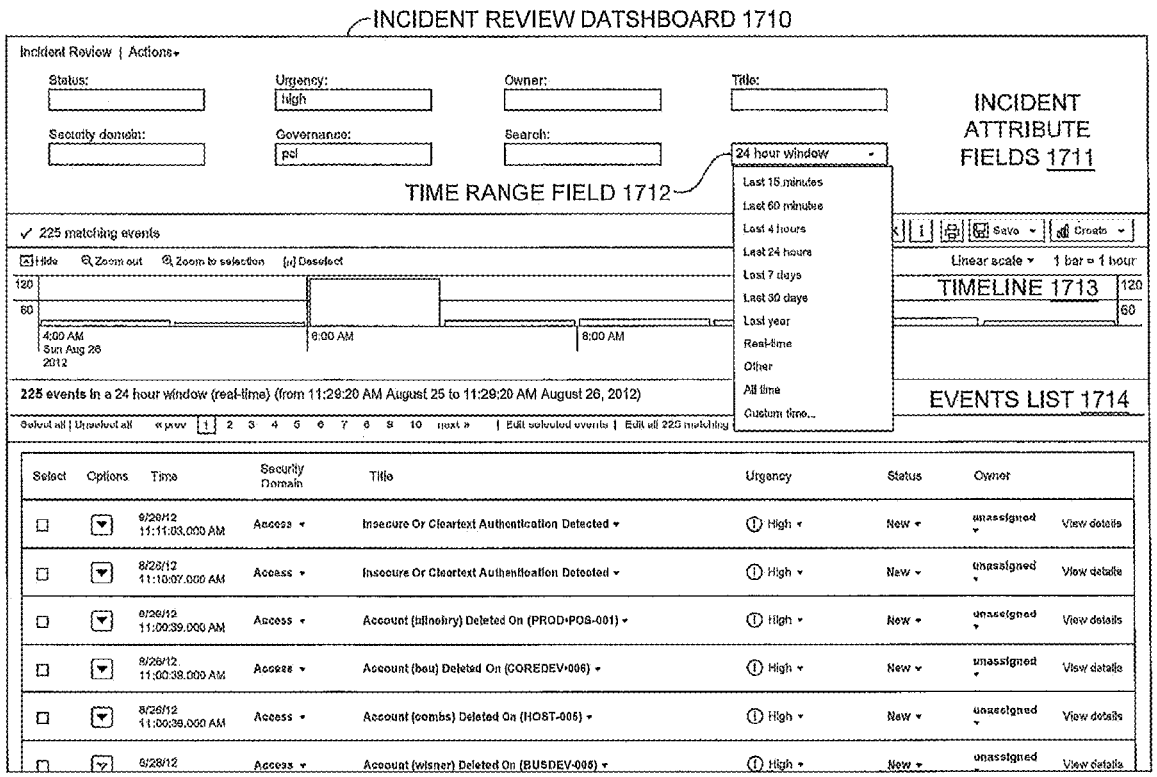
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
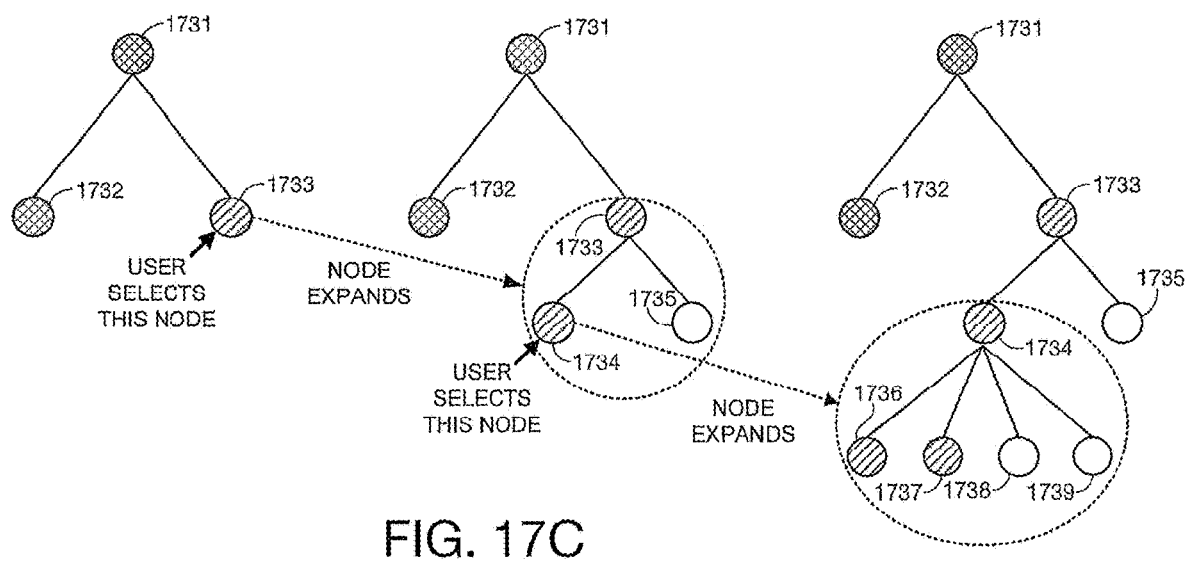
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
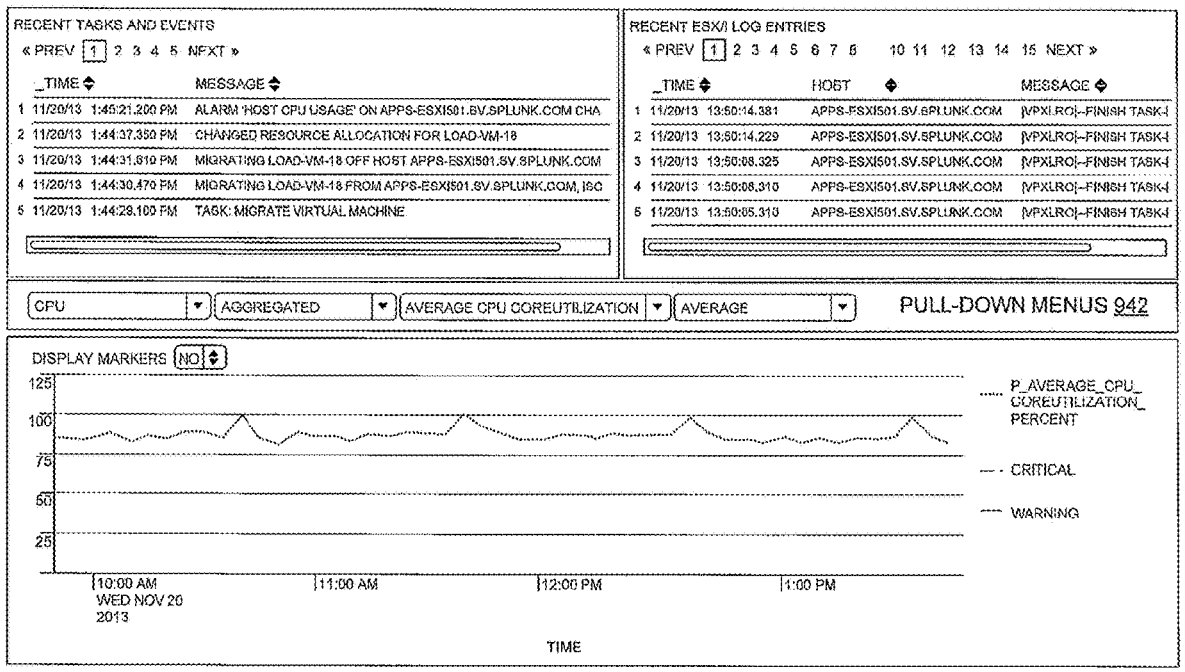
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

2.17. Multi-Tier Architecture

An architecture supporting multi-tier deployment may be advantageous in focusing the resources of an enterprise. An enterprise may have different system users, or groups of users, at different locations, with different roles and responsibilities. A multi-tier architecture may permit effective and efficient deployment of data input and query system (DIQS) instances with user-appropriate applications. DIQS instances supporting lower-tier, focused, work group oriented applications, for example, may be tailored to meet the specific needs of the associated application(s). Such tailoring may reduce installation size and operating burden both in terms of computing resources, space resources, and administrative overhead. Further DIQS instances for lower-tiers may be tightly packaged with a related lower-tier application, such that each is preconfigured for integrated operation with the other in an optimal way. Such integrated instances may all but eliminate administrative requirements for deployment that are not site-dependent.

Such lower-tier deployments may have interfaces to higher-tier deployments to reduce duplications of computing and human effort, to share functionality across the boundary, and to interoperate to provide feature integrations, for example. An illustrative example may be helpful. In the example, an enterprise may have deployed a lower-tier Entity Monitor application (EMA) that provides entity monitoring to a local workgroup of users tasked with the reliable operation of a bank of server racks. That same enterprise may have deployed a higher-tier service monitoring system (SMS) application that is used by the staff of a networks operation center to monitor major services provided by the enterprise information technology (IT) environment. (SPLUNK® IT SERVICE INTELLIGENCE™ is an example of such an SMS.) Enterprise email and customer-facing web page delivery may be examples of such services, and the services are performed by entities such as the servers in the racks monitored by the EMA. In the example enterprise, the deployed EMA may maintain a collection of entity definitions having information about the server entities, and the EMA may perform analytics against machine data pertaining to the entities a produce valuable metrics or representations reflective of the entities. Similarly, the deployed SMS may maintain its own collection of entity definitions having information about a broad set of entities including the server entities, and the SMS may perform analytics against machine data pertaining to the entities and produce valuable metrics or representations reflective of the entities in a broader context, such as the importance of an entity to maintaining the operation of a critical system service. The EMA and the SMS each has information the other does not, and may not be able to produce on its own, regarding an overlapping set of entities. Interfaces enable synergistic operational combinations.

In an embodiment, the lower-tier applications and the higher-tier applications interface to provide: one or more of mapped groupings of entities to the higher-tier services, both automatically and manually, business-level metrics which can be tied to data from the lower-tier application to create an end-to-end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

Users, such as system administrators and site reliability engineers, for example, are tasked with maintaining the overall health, availability, reliability and performance of one or more entities within an enterprise system in an information technology (IT) environment. Each entity may be a computing device, a virtual computing device, a group of computing devices or a group of virtual computing devices at a specific site or multiple sites within the enterprise system. Typically, these users monitor approximately entities of 800 to 1,000 computing devices.

Lower-tier applications, programs, or solutions of an event-based data intake and query system provide an analytics driven tool for infrastructure monitoring and troubleshooting of the entities that represent a subset of the enterprise system. While a higher-tier application of an event-based data intake and query system, such as the SPLUNK® ENTERPRISE system developed by Splunk Inc. of San Francisco, Calif. can analyze machine data across the enterprise system, the lower-tier application searches the machine data from the entities and provides entity-level metrics related to the performance of the selected entities with the enterprise system.

Embodiments of the lower-tier application are directed to monitoring performance of an entity at an entity-level using key performance indicators derived from machine data from the entity. Implementations of the lower-tier application provide users with metrics related to the performance of a monitored entity within an enterprise system in an information technology environment. The lower-tier-tier application allows users to monitor entities from a bottom-up perspective and provide visualization to trouble shoot entity related issues.

In an embodiment, lower-tier applications provide an analytic-driven IT operations tool that unifies metrics and logs for trouble shooting and monitoring hybrid IT infrastructure.

In a further embodiment, the lower-tier applications are single team focused and provide simple tagging and grouping, reliability scoring on entities and groups anomaly detection and adaptive thresholding for easy tuning; 24 hours of alerts and notifications with ability to mute alerts; metrics analysis workspace built into product; in-application collection guidance; self-service, and easy deployment.

In an embodiment, the lower-tier applications and the higher-tier applications interface to provide one or more of map groupings of entities to the higher-tier services, both automatically and manually, business-level metrics which can be tied to data from the lower-tier application to create an end to end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

In some embodiments, the lower-tier application does not permit clustering. Further, the user is not permitted to write applications that use the search engine, but is provided with graphic user interfaces for visualization of the entity-level metrics. The lower-tier applications comprise a single use, single channel solution.

Lower-tier applications may generally be considered to have more focused functionality than a higher-tiered application. Accordingly, a data input and query system (DIQS) with the functionality to sustain a higher-tiered application has no difficulty sustaining a lower-tiered application. However, it may be advantageous for a DIQS deployment strictly supporting a lower-tier application, or applications, to have no more complexity than what is required to support those lower-tier applications. Such a tailoring of the DIQS may simplify deployment, and reduce ongoing administration and overhead and operational costs.

Figure 18:
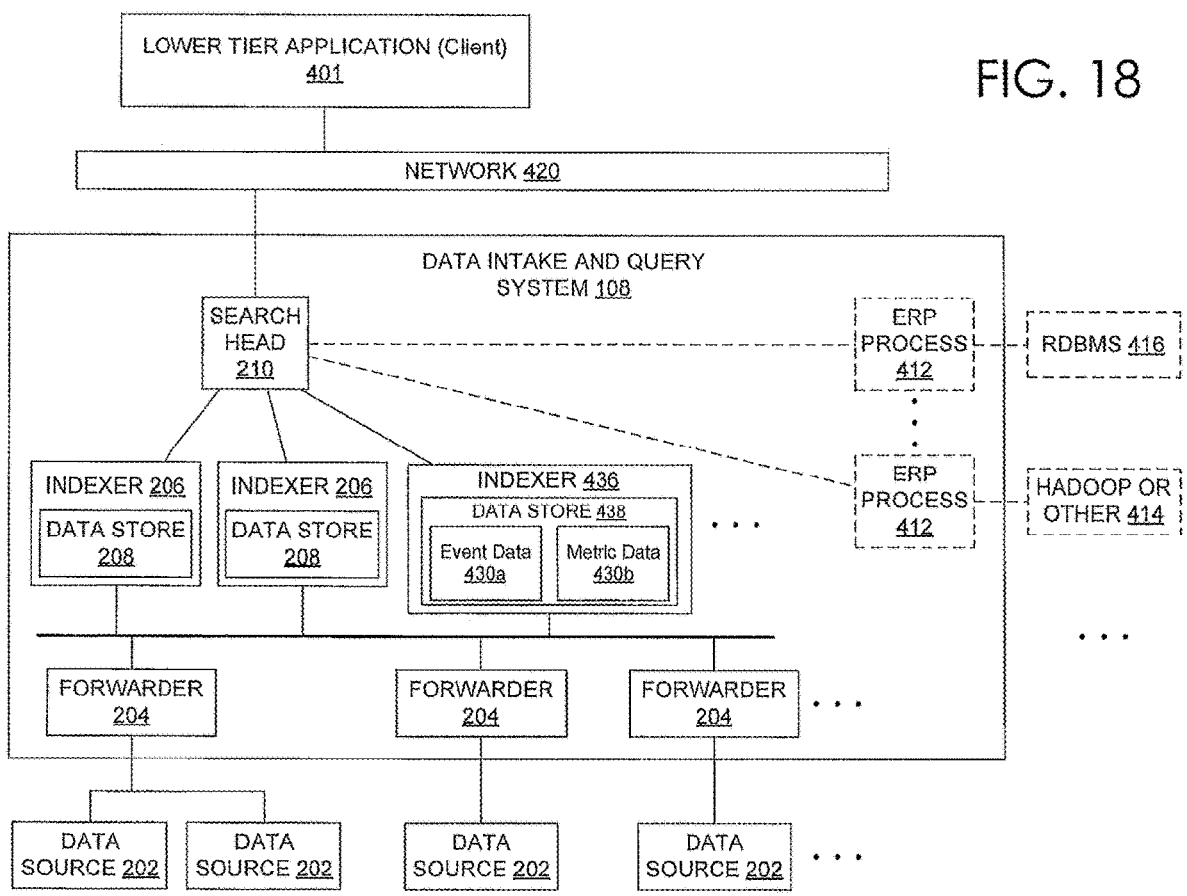
FIG. 18 is a block diagram of an example of a data intake and query system that supports the application level functionality of a lower-tier application, in accordance with example embodiments.

FIG. 18 shows a block diagram of an example of a data intake and query system 108 that supports the application level functionality of a lower-tier application in one embodiment. FIG. 18 represents an adaptation of the data input and query system 108 of FIG. 4 and like elements have common numbering as between the two figures, and the descriptions thereof are not repeated here. Notable differences for the example embodiment illustrated in FIG. 18 are described now. Client devices 404*a*, 404*b*, and 404*n*, of FIG. 4 are replaced in FIG. 18 by lower tier application 401 which acts as the client in relation to the underlying data input and query system (DIQS) 108. High functionality, direct user access to the underlying DIQS may generally not be provided. The DIQS may be adapted, supplied, configured, and provisioned to effect support for requests presented by the lower tier application, in an embodiment. As one example, DIQS 108 of FIG. 18 may exclude support for External Result Provider (ERP) processing as indicated by the dashed lines around and connecting ERP processes 412, RDBMS ERP 416, and Hadoop ERP 414. In one embodiment, a developer or provider of the lower-tier application may configure the DIQS functionality to only include what is required by the lower-tier application, perhaps through a user interface directed to building a customized DIQS configuration instance. In one embodiment, a customized DIQS instance may be able to be shared by a number of lower-tier applications such as 401.

In comparison to the DIQS 108 of FIG. 4, the DIQS 108 of FIG. 18 is shown to also include indexer instance 436 having data store 438. Indexer 436 and data store 438 operate just as described for indexers 206 and data stores 208 of FIG. 4—and any indexer 208 and data store 208 may comport with the details next described for indexer 436 and data store 438 of FIG. 18. Indexer 436 of FIG. 18 when processing the data of its associated data store 438 may distinguish and discriminate between different types or classes of data in its data store. Data store 438 is shown to include Event Data 430*a* storing data of an event data type and Metric Data 430*b* of metric data type. Event type data is already described in detail elsewhere in this written description. Metric type data may be data that is characteristically small per occurrence, high in volume, primarily numeric, and perhaps highly structured. An example of data with those characteristics may be performance or parameter measurements being constantly reported by networked devices such as computing machines in information technology environments, automated machinery on the shop floor of a factory, or sensors on the windmills of an energy farm. An indexer such as 436 having multiple data type capability may use functional processing specialized to the data type when responding to requests from search head 210 or receiving data from a forwarder 204. For example, indexer 436 may use different processing to effect the formatting, storage, indexing, retrieval, consolidation, aggregation, and such, of metric type data than it does for event type data in order to maximize or optimize the processing of each type of data to improve overall DIQS performance and functionality. Lower tier application 401 may invoke the processing of DIQS 108 for multiple types of data and, in one embodiment, the types of data supported by the indexers (206, 436) may be configurable for an instance of DIQS 108 customized to the lower tier application. These and other embodiments are possible.

Embodiments of the higher-tier application are directed to monitoring performance of a system at a service-level using key performance indicators derived from machine language. Implementations of the higher-tier application provide users with metrics related to the performance of a monitored service, such as services pertaining to an information technology environment. The higher-tier application allows users to monitor services from a top-down perspective and provide through customizable graphic user interfaces visualization to trouble shoot service related issues. Higher-tier applications permit clustering and users are permitted to create customer applications that use the search engine.

One example of a higher-tier application is an IT monitoring application, such as SPLUNK® IT SERVICE INTELLIGENCE™, which performs monitoring and alerting operations. Appendix A includes U.S. Patent Publication No. US2017/0147681A1, entitled "Portable Control Modules in a Machine Data Driven Service Monitoring System, filed on Jan. 9, 2017, which provides robust description of the IT SERVICE INTELLIGENCE™ higher-tier application.

2.18. Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0. Multi-Sourced Mobile Incident Resolution Interface

The foregoing describes embodiments of data intake and query systems and related applications that deliver high-value and actionable information from ingested machine data. Modern IT environments are environments rich with machine data and particularly well-suited to benefit from the earlier described technologies. Despite the broad array of data that may be ingested and rendered searchable by a data intake and query system (DIQS), and despite the wealth of application functionality that can be built around the resources and capabilities of a deployed DIQS, additional functionality related to DIQS data, applications, and services, may nonetheless be deployed outside of the DIQS environment or ecosystem for various reasons. Despite being outside of the DIQS environment, this additional functionality remains nonetheless related to the DIQS environment, and superior functionality can be delivered into the user's hands where mechanisms exist to acceptably allow a user application to reach both DIQS and non-DIQS systems to provide a combined, composite, synergistic result that benefits the user. And maybe literally into the user's hands where more and more high-end functionality needs to be made available to mobile devices for users on-the-go.

As one example, service monitoring for an IT environment may be admirably performed by DIQS-based service monitoring system (SMS) such as the aforementioned SPLUNK® IT SERVICE INTELLIGENCE™. As part of its operation, the SMS may churn through data representing millions of machine data events and identify events or occurrences of states or conditions that are particularly notable, and build a collection of such notable events. That collection may in turn be processed to identify new, emerging, and continuing patterns of notable events that are likely to be related to one another because they all relate in one way or another to an episode or incident occurring IT environment—an episode that likely needs increased visibility and escalation, and that may require automatic or manual intervention to fix, correct, remediate, or otherwise resolve a suboptimal situation. The user is very happy that the SMS essentially reduced tens, hundreds, or thousands of notable events to a single episode that can be methodically attacked. At this point, however, the user may take what is known about the episode to an incident management system outside of the DIQS environment to facilitate a favorable resolution of the episode. A user may rely on the outside incident management system for many reasons. In one case, a user may not be able to get equivalent incident management functionality within the DIQS environment. In one case, a user may have investments in an incident management system for her enterprise that deals with incidents far broader in scope than incidents occurring in the IT environment. Many reasons are possible.

Various methods may be employed to use data exchanges or other mechanisms to perform some type of synchronization between the DIQS which has certain and developing information related to the episode/incident and the incident management system (IMS) which has other certain and developing information. Such a synchronization may not be possible because different parties control each of the systems. Even where such synchronization may be possible, it is often impractical to perform such synchronization on an adequately real-time basis. Moreover, synchronization of data may be insufficient where what is really needed, over and above access to the data, is access to the functionality each system performs over its data.

The following disclosure relates to systems, methods, and mechanisms for effectively delivering a data system to a user, such as a dispatched technician or on-call service personnel, on a mobile platform for incident resolution, that delivers in a single interface display the combined data from multiple systems that need not necessarily be under the control of the same developer or operator. The features, aspects, and advantages will become apparent to one of skill in the art after consideration of the following disclosure.

Figure 19:
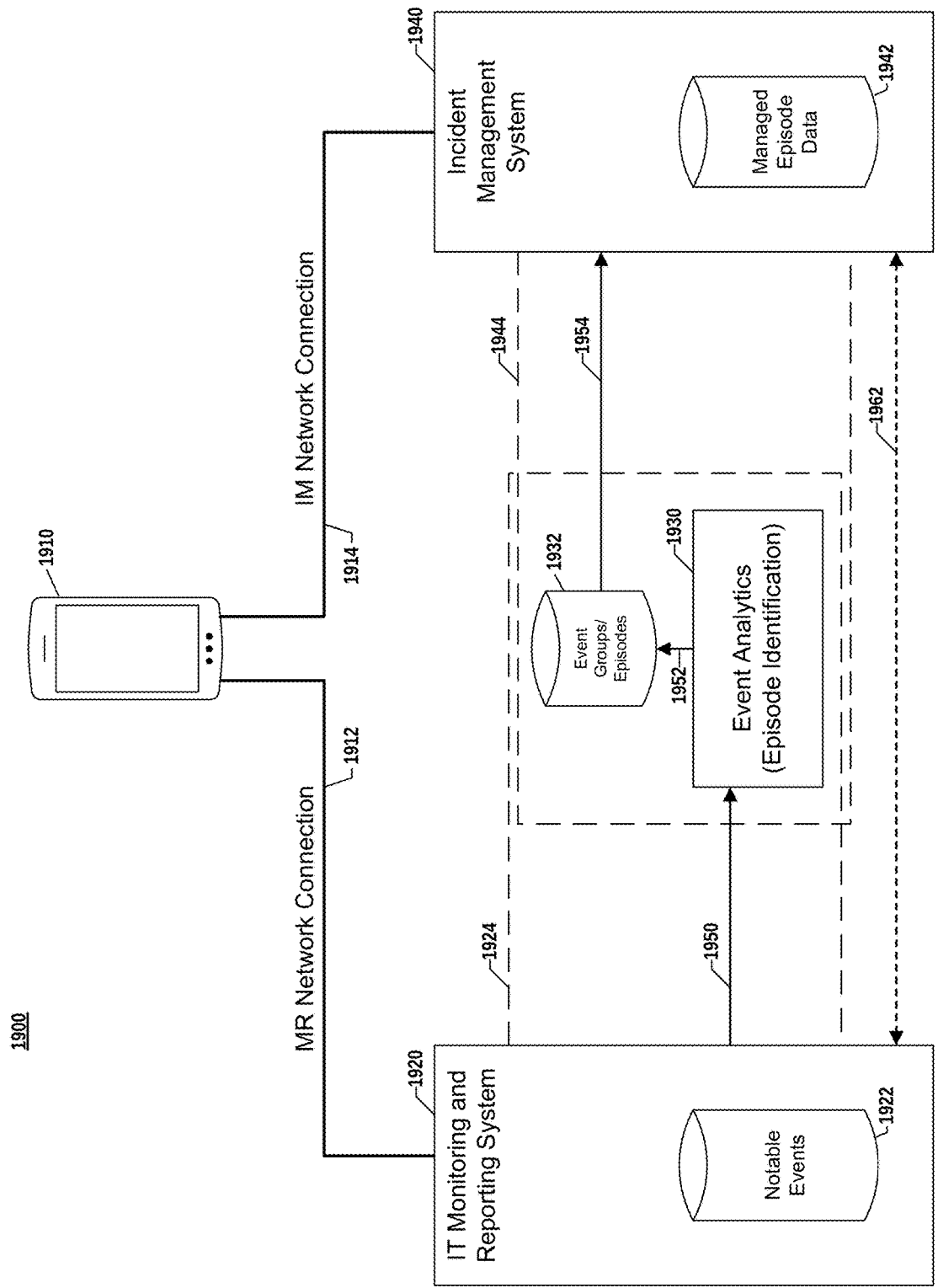
FIG. 19 is a block diagram of a system for producing dual-sourced composite user interface displays in one embodiment.

FIG. 19 is a block diagram of a system for producing dual-sourced composite user interface displays in one embodiment. System 1900 is described and discussed in terms of a system for producing composite user interface displays for incident management using information dual-sourced from a monitoring and reporting system for an information technology (IT) environment and from an incident management system. This particular implementation, using inventive aspects disclosed by this written description, is novel and useful, and provides a context to aid in illustrating and teaching inventive aspects. System 1900 is shown to include mobile computing device 1910 coupled by a first network connection 1912 to IT monitoring and reporting system 1920, and coupled by a second network connection 1914 to incident management system (IMS) 1940. Mobile computing device 1910 is able to present a composite interface display including at least some portion derived using data received from IT monitoring and reporting system 1920 and at least some portion derived using data received from incident management system 1940 in the same display page, that is to say, dual-sourced and composite. Such a display may be particularly useful during incident resolution and most may be closely aligned with the functions addressed by an incident management system, and so may be considered primarily an incident interface display. IT monitoring and reporting system 1920 is operationally independent from incident management system 1940, and vice versa. That is to say, while IT monitoring and reporting system 1920 and incident management system 1940 may be coupled for some data exchange, the data exchange is non-blocking to the ongoing, customary, and expected operations of each of the systems. For example, if the data exchange of its particular embodiment does not occur for incident management system 1940, its users can still expect to normally interact with the system and expect it will perform its normal functions, albeit with omitted information because of the absent exchange. The systems may be coupled for some amount of data exchange, coordination, and handshaking, for example, but will each continue to operate independently without regard to the operational state of the other.

Further, in addition to being operationally independent, systems 1920 and 1940 may be operator independent, that is to say each of systems 1920 and 1940 may be operated by different businesses, organizations, or entities. Operating such a system, here, refers to a business organization, entity, or such exercising control over the composition, function, and/or content of the system, and likely paying for it, and may or may not include having direct and immediate control over the computing platform elements that execute the system. For example, a business entity that designs, implements, and/or installs an incident management system such as 1940 may be considered the operator of that system even where it is deployed using the computing facilities of a cloud-based platform, such as Amazon.com, Inc's, Amazon Web Services (AWS), or Microsoft® Corporation's Azure Cloud. Further, a business entity that designs, implements, and/or installs an incident management system such as 1940 may be considered the operator of that system even where it is deployed in substantial part using one or more third-party software components by virtue of the choice, installation, platforming, and ongoing operation of that system directly or by contracted agents.

Further, an operator of the IT monitoring and reporting system or the incident management system, may be a service provider, and the operated system may accordingly be considered a service provider system, where the service provider system provides services over a network to paying subscribers.

IT monitoring system (ITMS or MS) is shown to include notable events data store 1922. In its processing, the IT monitoring system 1920 may recognize and record certain occurrences in respect of the IT system environment it monitors as notable events. One example notable event may be notable because of an ascribed importance to its informational content for a historic record, like a notable event that reflects successful synchronization with a master time reference. One example notable event may be notable because of an ascribed likelihood that it signals a condition requiring elevation to the attention of the system users, like a notable event that reports an increased rate of session abandonments over a five-minute period. Many types and reasons for notable events are possible. An example of such a commercially available IT monitoring system is the aforementioned SPLUNK® IT SERVICE INTELLIGENCE™ by Splunk Inc.

Illustrated between MS 1920 and IMS 1940 in FIG. 19 is event analytics component 1930 coupled to episodes data store 1932. Dashed box 1924 indicates that event analytics component 1930 and episode data store 1932 may be included as part of the IT monitoring system 1920 in an embodiment. Dashed box 1944 indicates that event analytics component 1930 and episode data store 1932 may be included as part of the incident management system 1940 in an embodiment. Event analytics component 1930 and episode data store 1932 may be part of neither IT monitoring system 1920 nor incident management system 1940, in an embodiment. Arrow 1950 represents a flow of notable event data from IT monitoring system 1920 to event analytics component 1930. Arrow 1952 represents the creation of event groups, incidents, or episodes, in computer storage as represented by episode data store 1932.

Terminology including event group, incident, and episode, in proper context, may each be used to refer to a recognized condition of certain data related to an IT system monitored by IT monitoring system 1920 that indicates a pattern of states or activity likely requiring remedial action, possibly including human attention or intervention—frequently a problem or alert condition. A server failure, a broken communications link, an email outage, or an inordinate increase in response times, are a few examples of such incidents, episodes, or event groups. As explained elsewhere, the event group terminology is appropriate where the existence of the incident or episode is recognized at least in part by determining the existence of a pattern among a number of notable events. For example, five router error events within a one minute period followed by an event reporting an increased rate of session abandonments over the next five minutes may be criteria that indicate a failing-router type incident. The recognized relationship among the router error and the session abandonment events forms an event group that, in a sense, defines an incident or episode. An event analytics component may post incident descriptive information to an episode datastore to represent or define the episode. Such descriptive information may include an identifier assigned to the episode, a title for the episode perhaps based on the criteria used to recognize the underlying group, timestamps such as for the creation time and/or earliest event time related to the episode, a list of notable events associated with the incident/episode, or any other useful information.

Incident management system (IMS) 1940 is shown to include managed episode data store 1942. IMS 1940 provides automated support to service personnel tasked with resolving, remediating, correcting, or otherwise addressing incidents that arise in an IT environment, for example, that require human attention and/or intervention of some type. IMS 1940 may include functional processing to monitor, report on, implement, or automatically conduct operations related to one or more of the many aspects of incident resolution, such as activity and event tracking, personnel and resource dispatching, personnel collaboration, incident management communication, and post-resolution review, for example. In an embodiment, IMS 1940 may receive information regarding some or all of the incidents recognized by event analytics component 1930 as reflected in episode data store 1932, and use that information to create, build, augment, maintain, update, or otherwise manipulate a list, group, set, collection, or such, of episodes recognized and processable by IMS 1940, as represented by managed episode data store 1942 of FIG. 19. Arrow 1954 represents a flow of incident data from event analytics component 1930 to incident management system 1940. An example of a commercially available incident management system is VictorOps™ from Splunk Inc., as documented at victorops.com and splunk.com/en_us/software/victorops.html at the time of this application.

Arrow 1962 represents a communication channel between MS 1920 and IMS 1940. Communication channel 1962 may be a network connection, and may use the Internet or other internetwork facilities and technologies to substantially effect the data transmission and signaling between the MS and the IMS. In one embodiment, for example, communication channel 1962 may underlie the conveyance of incident or episode data as indicated by arrow 1954 from an event analytics component 1930 of an MS 1922 IMS 1940. In one embodiment, for example, communication channel 1962 may be used to transfer information regarding one or more notable events of data store 1922 of MS 1920. In one embodiment, for example, communication channel 1962 may be used to perform coordination or handshaking between the MS and the IMS. For example, in one embodiment, after receiving information regarding a new incident from event analytics component 1930, IMS 1940 may transmit a new identifier it has assigned the incident to MS 1920, to be used in future communications regarding the incident. In such an embodiment, MS 1920, for example, may take the IMS incident identifier and associate it with each of the notable events of 1922 that are first or subsequently included in an event group that gave rise to the recognition and creation of the incident. As another example, in one embodiment, after service personnel reflect a "closed" status for the incident in the IMS, the IMS may report the change in status to the MS via channel 1962 so that MS can update a status flag it maintains for its notable events accordingly. Many embodiments are possible and the amount of handshaking or coordination between MS 1920 and IMS 1940 may be complex and robust, simple and straightforward, or negligible to nonexistent.

In one embodiment, coordination between MS 1920 and IMS 1940 may include a central shared database or repository (not shown) that includes, for example, all relevant data describing and/or defining incidents, and all relevant data detailing notable events associated with those incidents. In one embodiment, coordination between MS 1920 and IMS 1940 may include replicating such a database or repository in each of MS 1920 and IMS 1940, with automatic synchronization. In one embodiment, each of systems MS 1920 and IMS 1940 may be designated as the canonical or authoritative source for a respective segment of information, and coordination between the systems may include exchanging information that allows cross-referencing one to the other. For example, in such an embodiment, MS 1920 may be designated as the canonical source for notable event data, and IMS 1940 may be designated as the canonical source for episode descriptive data, including a list of known episodes with their identifiers and any other descriptive or definitional data, and the MS and IMS may exchange episode and notable event identifiers sufficient to enable adequate cross-referencing. Many embodiments are possible. One of skill will, too, appreciate that data shared or duplicated for intersystem coordination is sufficient to effect the desired coordination but in many cases may not be all of the information a system has regarding the shared item. For example, in one embodiment, an incident management system may share identifier, description, creation time, and status information for relevant incidents while not sharing the other information it maintains in respect of the incidents, such as timelines of activity, assigned personnel identifications, communication channel content, and more.

Again, while the discussion of system 1900 of FIG. 19 has been conducted using an example of a mobile application useful to service personnel in an incident management context, that can deliver a composite display using information from both an incident management system and an IT monitoring and reporting system, inventive aspects taught herein are not so limited.

Figure 20:
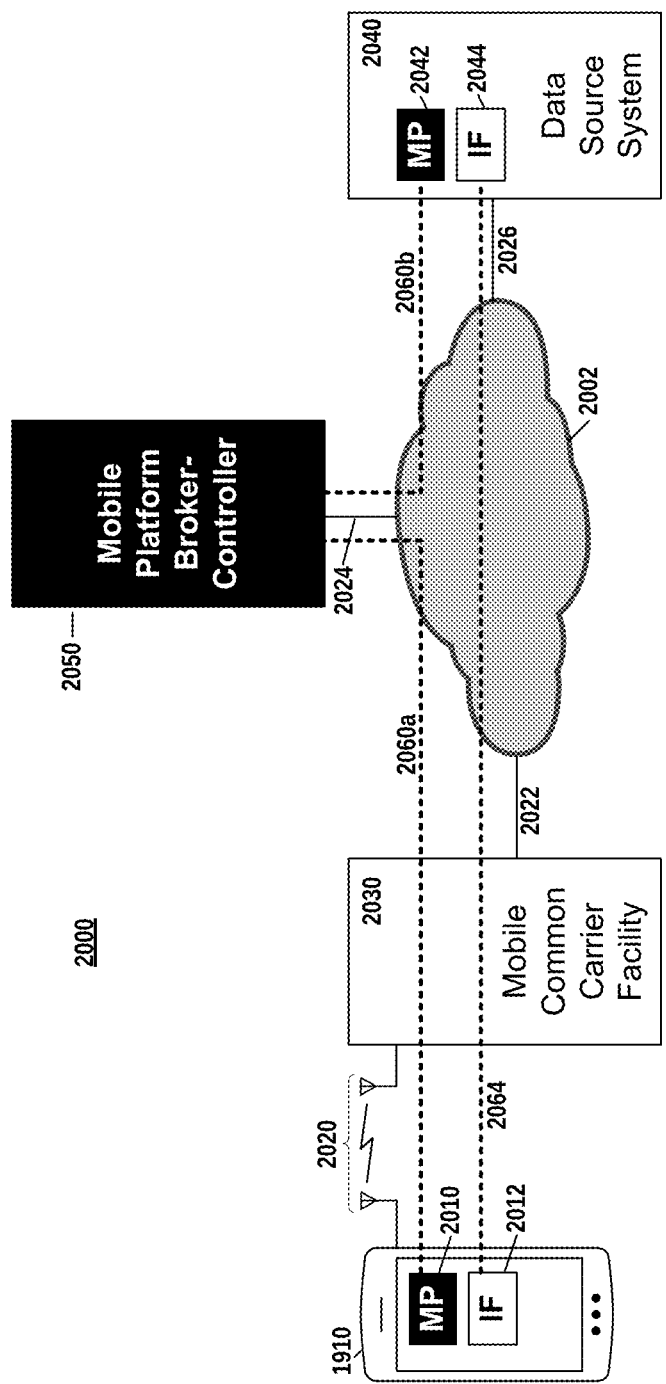
FIG. 20 is a block diagram illustrating examples of mobile connection types.

FIG. 20 is a block diagram illustrating examples of mobile connection types. System 2000 illustrates two different connection types being made between a mobile device and a representative data system that is a source of information for an application on the mobile device. System 2000 is shown to include mobile computing device 1910, mobile common carrier facility 2030, network 2002, data source system 2040, and mobile platform broker-controller 2050. Mobile computing device is shown to be coupled with mobile common carrier facility 2030 via wireless/cellular connection 2020. Mobile common carrier facility 2030, data source system 2040, and mobile platform broker-controllers 2050 are shown to each be coupled to network 2002 via connections 2022, 2026, and 2024, respectively. Mobile computing device 1910 is shown to include mobile platform component 2010 and native interface component 2012. While depicted in the display area of mobile computing device 1910, mobile platform component 2010 and native interface component 2012 are software components executing on the mobile computing device. Data source system 2040 is shown to include mobile platform component 2042 and native interface component 2044. Mobile platform component 2042 and native interface component 2044 are software components executing in data source system 2040. One of skill appreciates that while discussed in our instructional examples in terms of software-executing-on-hardware, an accessible and desirable form, the aforementioned mobile platform components and native interface components may be implemented by other technologies in an embodiment, for example, as the configured logic of an FPGA or ASIC.

System 2000 is shown to include two different mobile network connections, channels, pathways, or the like between mobile computing device 1910 and a data source system 2040. Each mobile network connection uses networking facilities to convey data between the mobile computing device 1910 and the data source system 2040, each an endpoint of the mobile network connection, channel, or pathway. Each mobile network connection includes a segment near the mobile communications device that conveys the data via wireless means, such as the radio frequency (RF) signals used in mobile cellular radio networks. In the illustrated embodiment, wireless segment 2020 couples mobile computing device 1910 to the mobile common carrier facility 2030. Mobile common carrier facility 2030 includes the antennae, base stations, support nodes, private networks, and other infrastructure as may be deployed by a mobile network operator, wireless service provider, wireless carrier, cellular company, mobile network carrier, or such by any name, to provide wireless communication service to mobile computing devices such as 1910, including the service to couple a connected mobile computing device with a network such as 2002 for data communication. While mobile common carrier facility 2030 is discussed in terms of a common carrier that provides public telecommunications facilities to its diverse subscribers, one of skill will appreciate that a private facility that couples the wireless communications of mobile computing platform 1910 to network 2002 may be employed in an embodiment without departing from the practice of inventive aspects. Network 2002 may be any network or internetwork (a network of networks) capable of facilitating the connection pathways illustrated in FIG. 20, and may include, in whole or in part, alone or in combination, local area networks (LANs), wide area networks (WANs), metropolitan area networks (MANs), the Internet, and others, for example.

A first type, class, or category of mobile network connection is illustrated by connection 2064 of FIG. 20. Mobile network connection 2064 is shown to couple native interface component 2012 of the mobile computing device with native interface component 2044 of the data source system. Mobile network connection 2064 includes the underlying transport mechanisms of wireless link 2020, mobile common carrier facility 2030, network 2002, and attachments 2022 and 2026 thereto. Interface component 2012, as one endpoint of mobile network connection 2064, may include a software component that is a standard part of the operating system code executing on mobile computing platform 1910, such as a TCP/IP network stack that provides native support to mobile applications executing under the operating system for conducting TCP/IP data communications such as those conducted over the Internet. Other protocols and network stacks are possible. Interface component 2044, as one endpoint of mobile network connection 2064, may include a software component is a standard part of the operating system code of a computing device of data source system 2040, such as a TCP/IP network stack that provides native support to hosted applications for conducting TCP/IP data communication such as those conducted over the Internet. Other protocols and network stacks are possible.

In one example embodiment, a native, basic, standard, or conventional mobile network connection, such as 2064, is used by a mobile application running on mobile computing device 1910 to retrieve data from data source system 2040 in order to generate a desired display on the mobile computing device screen. In this example embodiment, the mobile application may be developed and distributed by the operator of data source system 2040. The intimate knowledge the operator has of data source system 2040 and the control it has over the mobile application permits it to choose the use of a native network connection such as 2064 to implement a very tight and focused connection between the application on the mobile computing device and the data source system process that will supply data to the mobile application. Program instructions included to be executed at each end exercise their respective native interface component to open sockets for network communication and to establish connection 2064, in an embodiment.

A second type, class, or category of mobile network connection is a facilitated mobile network connection and is illustrated by connection 2060a, mobile platform broker-controller 2050, and connection 2060b of FIG. 20. In one example embodiment, a facilitated mobile network connection is employed by a mobile application running on mobile computing device 1910 to retrieve data from data source 2040 in order to generate a desired display on the mobile computing device screen. In this example embodiment, the mobile application may have been developed and distributed by someone other than the operator of data source system 2040. The mobile application may be widely distributed and the operator of data source system 2040 may have little advance knowledge of the number of mobile endpoints and the volume of requests that may be presented to it. In such a case, the operator of data source system 2040 may allow interfacing to the data source system only via a facilitated mobile network connection. In one embodiment, a mechanism such as mobile platform broker-controller 2050 may be deployed in the network to mediate a connection between mobile computing device 1910 and data source system 2040. Many embodiments are possible for a mechanism such as mobile platform broker-controller 2050 and various embodiments may offer various advantages to the operator of data source system 2040 including improved security, simplified system administration, greeting unsolicited network traffic outside of a protective firewall, and others.

An example facilitated mobile network connection comprises a first leg or segment 2060a between mobile platform component 2010 and mobile platform broker-controller 2050. Segment 2060a includes the underlying transport mechanisms of wireless link 2020, mobile common carrier facility 2030, network 2002, connections 2022 and 2024 thereto, and mobile platform broker-controller 2050. Leg or segment 2060b includes the underlying transport mechanisms of mobile platform broker-controller 2050, network 2002, and connections 2024 and 2026 thereto. In operation, a mobile application installed and running on mobile computing device 1910 may exercise the functionality of mobile platform component 2010 to initiate communication with data source system 2040 via the mobile platform broker-controller. Functionality of mobile platform component 2010 may initiate communication by signaling mobile platform broker-controller at its network location with an indication that the ultimate endpoint for communication on the connection is data source system 2040, or more particularly mobile platform component 2042 of the data source system. Mobile platform broker-controller 2050, in response to the signaling, conducts operations as necessary, including any communications with mobile platform component 2010 via segment 2060*a*, and with mobile platform component 2042 via segment 2060*b*, to establish an end-to-end facilitated mobile network connection acceptable to both endpoints. Such operations may include endpoint validation where mobile platform broker-controller 2050 performs authentication and/or authorization processes to verify the identity of one or both endpoints and/or to verify the acceptability of establishing a communication channel between such endpoints. As will now be understood by one of skill in the art by consideration of the foregoing, mobile platform broker-controller 2050 and mobile platform components 2010 and 2042, possibly along with the connections therebetween, form the mobile interface facility of the illustrated embodiment that makes possible a facilitated mobile network connection. Mobile platform broker-controller 2050 as described is now understood to include at least a message broker component that mediates, negotiates for, and/or facilitates full distance communication between the endpoints.

In one embodiment, mobile platform broker-controller 2050 may act as a communications tunnel bridge to improve the security and reliability of connections between a service provider system such as data source system 2040 and the potentially many service client systems, implemented as mobile applications installed on mobile computing devices such as 1910, which may attempt to utilize the services of system 2040. Such a communications tunnel bridge is robustly disclosed in commonly owned U.S. patent application Ser. No. 16/051,326, entitled "Trusted Tunnel Bridge" and filed Jul. 31, 2018, (the Trusted Tunnel Bridge Application) which is hereby incorporated by reference in its entirety for all valid purposes. The reader is generally directed to the entirety of the disclosure of the Trusted Tunnel Bridge Application. The reader is more pointedly directed to FIG. 19 of the Trusted Tunnel Bridge Application and the related description in the specification noting the following useful analogs for understanding an application of the trusted tunnel bridge teachings in the present context: destination device 1922 of FIG. 19 of the Trusted Tunnel Bridge Application as an analog to mobile computing device 1910 of FIG. 20 of the instant application; data system 108 and source application 1912 of FIG. 19 of the Trusted Tunnel Bridge Application as an analog to data source system 2040 of FIG. 20 of the instant application; tunnel bridge 1930 in combination with database 1940 of FIG. 19 of the Trusted Tunnel Bridge Application as an analog to mobile platform broker-controller 2050 of FIG. 20 of the instant application; Web Socket connection 1954 of FIG. 19 of the Trusted Tunnel Bridge Application as an analog to connection segment 2060*a* of FIG. 20 of the instant application; and Web Socket connection 1952 of FIG. 19 of the Trusted Tunnel Bridge Application as an analog to connection segment 2060*b* of FIG. 20 of the instant application. The reader is further directed to FIG. 20 and the related discussion in the written description of the Trusted Tunnel Bridge Application regarding additional detail to the analog of mobile platform broker-controller 2050 of FIG. 20 of the instant application. The reader is further directed to FIGS. 21-22 and the related discussion in the written description of the Trusted Tunnel Bridge Application regarding additional detail of component interactions. The reader is further directed to FIG. 23 and the related discussion in the written description of the Trusted Tunnel Bridge Application regarding an operational description.

It is apparent to one of skill in the art familiar with the Open Systems Interconnection (OSI) model of telecommunications for computing systems that mobile network connection 2064 is a connection at one or more of the host layers (layer 4 and above) and that other mobile network connections (such as the mobile platform connection including segments 2060*a* and 2060*b*) are properly considered separate, distinct, and different connections even if sharing media and mechanisms that implement subordinate layers (e.g., media layers 1-3). In this regard, the mobile network connections may be considered in a sense logical connections, and to be separate, distinct, or different, any two connections need only be logically separate or distinct from one another at the appropriate level of consideration.

Figure 21:
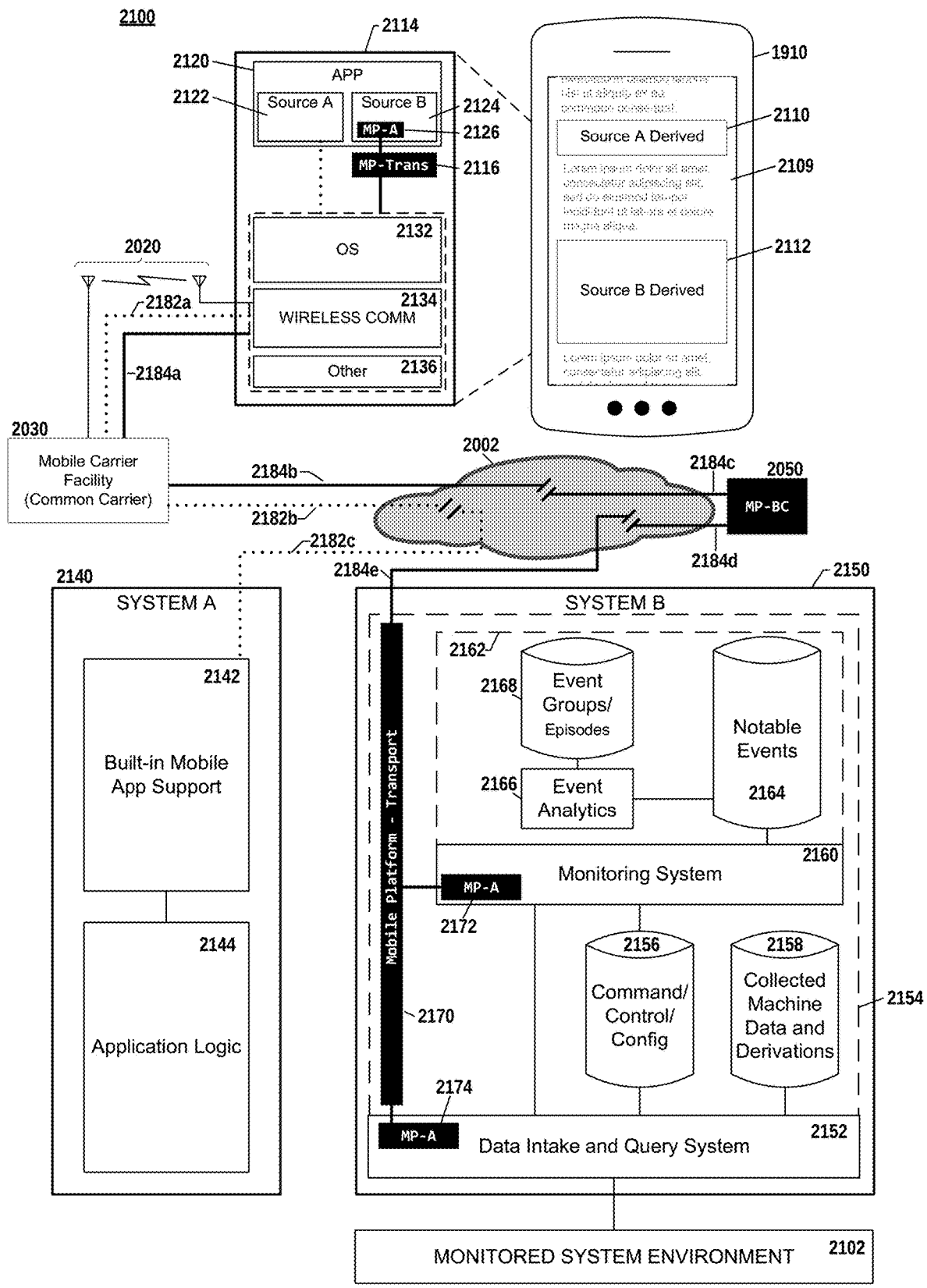
FIG. 21 is a block diagram of a system for producing dual-sourced composite user interface displays in one embodiment including a DIQS-based monitoring system and mobile interface facility arrangement.

FIG. 21 is a block diagram of a system for producing dual-sourced composite user interface displays in one embodiment including a DIQS-based monitoring system and mobile interface facility arrangement. A dual-sourced composite user interface display 2109 is presented by the mobile computing device 1910 and includes data 2110, 2112 derived from information retrieved from two different sources. The composite interface display 2109 is created by a mobile application 2120 executing in the internals 2114 of the mobile computing device. A representative depiction of the structure of a mobile computing device such as 1910 may be considered by reference to FIG. 18A of the Trusted Tunnel Bridge Application and the related discussion in the written description. A mobile computing device 1910 of FIG. 21 may be configured in one embodiment as mobile device 404 of FIG. 18A of the Trusted Tunnel Bridge Application in combination with at least display device 1824 or some alternative providing the desired human interface, if not also with one or more of camera 1820, location sensor 1822, microphone 1826, and others. Mobile application 2120 of FIG. 21 may correspond to application 1814 of FIG. 18A of the Trusted Tunnel Bridge Application. Mobile application 2120 may be preinstalled on mobile computing device 1910 by arrangement with the device manufacturer or distributor. In one embodiment, mobile application 2120 may be installed by the user on mobile computing device 1910 using application acquisition, installation, and maintenance capabilities installed on the device. Such installation may involve the mobile application developer submitting a copy of the packaged program logic of the mobile application to a digital distribution service. The digital distribution service may be dictated by characteristics of mobile computing device 1910. For example, if mobile computing device 1910 utilizes the iOS operating system from Apple Inc. of Cupertino Calif., the mobile application may be required to be delivered via the Apple App Store digital distribution system. For example, if mobile computing device 1910 utilizes the Android operating system from Google Inc. of Mountain View Calif., the mobile application may optimally or necessarily be delivered via the Google Play digital distribution system. The application package delivered from the digital distribution system can then be installed to executable form on mobile device 1910.

The application includes the processing logic 2122, 2124 to interface with two different sources of relevant data, each connected to the application 2120 for information retrieval via a respective mobile network connection. In the illustrated example of system 2100 of FIG. 21, one of those connections is illustrated to be a native, basic, or closed proprietary type of mobile network connection as discussed earlier in relation to FIG. 20. That native or basic type connection of system 2100 of FIG. 21 is shown to include connection segments 2182*a-c*, coupling the mobile application data source component 2122 to the built-in mobile app support 2142 of the first data source system 2140 via a mobile carrier facility 2030 and network 2002. In the illustrated example of system 2100 of FIG. 21, the other of the independent mobile network connections is illustrated to be a facilitated mobile network connection as discussed earlier in relation to FIG. 20. The facilitated connection of system 2100 of FIG. 21 is shown to include connection segments 2184*a-e*, coupling the mobile application data source component 2124 to both the data intake and query system (DIQS) 2152 and monitoring system 2160 of the second data source system 2150 via mobile platform components on the mobile device 2126, 2116, mobile carrier facility 2030, network 2002, mobile platform broker-controller 2050, network 2002 again, and mobile platform components of the data source system 2170, 2172, 2174.

In operation, mobile application 2120 may receive a signal, such as the detection of a user touch press on the display screen, indicating the user's desired to navigate to a user interface displaying a composite of information. At some point, program logic 2122 of application 2120 conducts communication with a first data source system 2140 using a first mobile network connection to obtain data used to populate a portion 2110 of the desired user interface display. At some point, program logic 2124 of application 2120 conducts communication with a second data source system 2150 using a second, independent mobile network connection to obtain data used to populate a portion 2112 of the desired user interface display. Program logic of application 2120 then uses the data obtained from both data source systems to derive the content for corresponding portions 2110 and 2112 of user interface display 2109. Many methods may be used to derive the content including, for example, direct copying, summarizing, reformatting, statistically analyzing, combining, merging, sorting, extracting, visualizing, graphically rendering, and all such. In all of these examples, data obtained from the source data system is used in some way by the mobile application to produce the content appearing in some portion of the user interface display. In one embodiment, data obtained from both data sources is used as needed to derive information appearing in a common portion of the display, for example, where essential data from both is somehow used to produce a singular result to be displayed.

System 2100 of FIG. 21 is comparable in many ways to system 1900 of FIG. 19 already discussed. One difference that will become apparent is that one of the dual-source systems, 1940 of FIG. 19, is specifically identified and discussed as an incident management system while its counterpart system, 2140 of FIG. 21, is described more generically as one of the dual-source systems of system 2100 of FIG. 21. After consideration of the preceding and following disclosure, one of skill will appreciate how readily incident management system 1940 of FIG. 19 could serve as one implementation of data source system 2140 of FIG. 21. One of skill can also appreciate how the practice of inventive aspects may extend to obtaining information from systems other than incident management systems. Accordingly, data source system 2140 is described more generically and depicts a system having application logic 2144 adapted in some way to responding to requests for data from a mobile application via a mobile network connection interfaced via mobile application support component 2142. Mobile application support component 2142 may be comparable, for example, to interface component 2044 of FIG. 20, and may include fundamental network communications functions, services, and/or capabilities exposed by operating systems executing in system 2140 for use by application logic. In one embodiment, mobile application support component 2142 may include functions, services, and/or capabilities, such as predefined data requests, extended by application logic 2144, perhaps specifically adapted to the known or anticipated needs of mobile application 2120. Such an embodiment may offer efficiency, speed, or other advantages, perhaps particularly where the operator of system 2140 or the sponsor/creator of application logic 2144 is also the sponsor/creator of mobile application 2120. Many embodiments are possible.

System 2100 of FIG. 21 depicts a number of elements carried forward from earlier figures and bearing identical numbering. Such elements include mobile computing device 1910, mobile carrier facility 2030, wireless/cellular connection 2020, network 2002, and mobile platform broker-controller 2050. The earlier description and discussion of these elements should be understood to substantially apply to the elements as they appear here unless good reason and logic dictate otherwise. Other elements of system 2100 of FIG. 21, though not bearing identical numbering, may bear substantial similarity or be comparable or analogous to elements discussed in relation to earlier figures in understandable respects. Where those correlations are identified, one should consider earlier descriptions and discussion to be applicable to the corresponding elements of FIG. 21 to the extent logic, reason, and the good sense of one of skill in the art will allow. Upon consideration and reflection over this written description one of skill will appreciate how the following elements of system 2100 of FIG. 21 can find useful analogs in the elements of earlier figures, including: SYSTEM-A 2140 of FIG. 21 as comparable to system 1940 of FIG. 19, and to data source system 2040 of FIG. 20; SYSTEM-B 2150 of FIG. 21 as comparable to system 1920 of FIG. 19, and to data source system 2040 of FIG. 20; notable events data store 2164 of FIG. 21 as comparable to notable events data store 1922 of FIG. 19; episode data store 2168 of FIG. 21 as comparable to episode data store 1932 of FIG. 19; event analytics component 2166 of FIG. 21 as comparable to event analytics component 1930 of FIG. 19; mobile platform application component 2126 of FIG. 21in combination with mobile platform transport component 2116 of FIG. 21 as comparable to mobile platform component 2010 of FIG. 20; mobile platform application components 2172 and 2174 in combination with mobile platform transport component 2170 of FIG. 21 as comparable to mobile platform component 2042 of FIG. 20; the combination of mobile network connection segments 2182*a*, 2182*b*, and 2182*c* of FIG. 21 as comparable to combination of mobile network connection 2064 of FIG. 20; and the combination of mobile network connection segments 2184*a*, 2184*b*, 2184*c*, 2184*d*, and 2184*e* of FIG. 21 as comparable to the combination of mobile network connection segments 2060*a* and 2060*b* of FIG. 20.

Mobile computing platform 1910 of system 2100 of FIG. 21 is shown to include a screen display area 2109 populated with information and including screen display area 2110 depicted as including content derived from data received from data source system 2140, and including screen display area 2112 depicted as including content derived from data received from data source system 2150. The depiction of mobile computing platform 1910 is expanded to illustrate internal functional components 2114 of mobile computing platform 1910. Such mobile functional components may be implemented as software residing in one or more memories and executed by processing hardware of the mobile computing platform, and/or as dedicated or configurable circuitry of the mobile computing platform. Functional components 2114 is shown to include mobile application 2120, operating system 2132, wireless communication 2134, and other components 2136. Mobile application 2120 is shown to include a first source data component 2122 and a second source data component 2124. Second source data component 2124 is shown to include mobile platform application component 2126. Mobile platform application component 2126 is shown coupled to mobile platform transport component 2116 which is to be understood to be coupled to mobile network connection segment 2184*a* via operating system 2132 and wireless communication component 2134.

In contrast to FIG. 20, where the mobile platform component 2110 resident on mobile computing platform 1910 is illustrated as a singular element, the mobile platform component of mobile computing device 1910 of FIG. 21 is shown divided into two subcomponents, a mobile platform application component 2126 and a mobile platform transport component 2116. The depiction illustrates a layered construction of the embodiment of the mobile platform facility of system 2100 such that a transport layer component 2116 handles data communications over the associated mobile network connection for all functional components of the device or host (i.e., mobile computing platform 1910, the host as the layer endpoint equivalent). Mobile platform transport layer component 2116 may mediate from the host level to a lower, application level and effect processing to multiplex/demultiplex the host-level data streams from/to one or more lower level application logical data streams or channels where an application functionality, such as the data source B handling processes of 2124, implements the application layer endpoint using mobile platform application component 2126. Embodiments may vary as to whether mono-layer of multi-layer processing components are used to implement the mobile platform facility itself, apart from any layering of the underlying network communications facilities on which it sits atop. Embodiments may similarly vary in the tasks or functions performed at each level and may include aspects regarding multiplexing/demultiplexing, encrypting/decrypting, authenticating, authorizing, aggregating, buffering, flow management, monitoring, measuring, reformatting, translating, transforming, or any other process or operation useful to deliver the operational functions and features desired for the mobile platform facility.

Similarly, at the other end of mobile network connection made up of segments 2184*a-e*, segment 2184*e* is shown connected to mobile platform transport layer component 2170 of second data source system 2150, which in turn is shown connected to the lower level mobile platform application component 2172 of monitoring system 2160 and to the lower level mobile platform application component 2174 of data intake and query system 2152. The layered mobile platform implementation illustrated and just discussed for system 2100 of FIG. 21 is one embodiment enabling mobile application 2122 get data from multiple provision points available in a single data source system 2150. Other embodiments are possible. In an embodiment, a mobile application as 2120 may exercise one or both provision points 2172, 2174 to get data as necessary from a specific desired source, whether SMS or DIQS.

Data source system 2150 provides a more detailed description of an IT monitoring and reporting system such as described for system 1920 of FIG. 19 extended as shown by dashed box 1924. The details discussed in relation to system 2150 are not essential to the practice of inventive aspects disclosed herein but rather represent a robust embodiment useful to illuminate possible practices useful in relation to the inventive aspects. Monitoring system 2160 of data source system 2150 may seem of central importance because of the examples chosen to teach and illustrate the inventive aspects around a dual-sourced mobile application interface; however, one of skill will appreciate by consideration of this disclosure, other and broader benefits and uses of the teachings herein including, for example, the use of a generalized data intake and query system such as 2152 as a data source endpoint for a mobile network connection.

Data source 2150 represents an embodiment of a monitoring system, more particularly an IT monitoring and reporting system, and even more particularly a service monitoring system, that is to say an IT monitoring and reporting system that principally organizes, analyzes and presents the monitored IT environment in terms of the services it provides. The service monitoring system (SMS) component 2160 of data source 2150 performs its work largely driven by a steady influx of data produced by or about the components of the monitored IT system environment. In the example of 2150, monitoring system 2060 obtains its influx of data from an underlying or companion data intake and query system (DIQS) 2152. DIQS 2152 may be an embodiment such as described earlier in relation to data intake and query system 108 of FIG. 1 and beyond, or cloud-based data intake and query system 1006 of FIG. 3, or the like. Dashed box 2154 indicates a DIQS-centered execution platform, environment, or ecosystem shown to include monitoring system 2162. In operation, DIQS 2152 ingests machine data produced by or about the monitored IT system environment 2102, and stores it along with derivations at data store 2158. DIQS 2152 receives for ingestion data from multiple sources produced by or about the various entities or components of the IT environment 2102. The list of entities may include operational components such as desktops, servers, disk arrays, hubs, routers, modems, and all such as may be used to build the IT environment and infrastructure of a company, division, or facility, for example. The data ingestion and other processes performed by DIQS 2152 are directed in accordance with command/control/configuration (CCC) data 2156. Functionality of DIQS 2152 enables administrators to establish, view, and modify CCC data 2156 to adjust the operation of the DIQS much as the operator of a simple device might use the buttons, dials, and switches of its control panel to control the operation of that device. Monitoring system 2160 obtains certain of the collected machine data and its derivations 2158 from DIQS 2152 and, perhaps, by its operation may feed new derivations back to DIQS 2152 for inclusion in data store 2158. In an embodiment, monitoring system 2160 may obtain information such as machine data from DIQS 2152 by submitting search queries to the DIQS. The service monitoring operations of monitoring system 2160 may similarly be directed by CCC information such as illustrated at 2156. CCC data 2156 is shown as shared between DIQS 2152 and monitoring system 2160 for simplicity but in an embodiment, each may have its own CCC data store. Based on its processing of the data about the monitored IT environment it receives from DIQS 2152, monitoring system 2160 will create notable event instances represented by notable events data store 2164. Each such notable event instance may result from one or more event, metric, or other information items received from DIQS 2152. The notable events of 2164 becomes input to event analytics component 2166. The event analytics component of the illustrative embodiment processes the notable events to identify groups of one or more events that signify an incident or episode condition for the monitored IT environment that likely requires increased attention, visibility, or automated or human intervention. Data source system 2150 may be implemented in an embodiment using a commercially available monitoring system, an example of which is next discussed.

The earlier mentioned SPLUNK® IT SERVICE INTELLIGENCE™ developed by Splunk Inc. of San Francisco, Calif., is an example of a commercially available monitoring system, such as 2160 and 2162 as implemented on the platform 2154 of DIQS 2152, and particularly includes the functionality for a service monitoring system (SMS) capable of monitoring services implemented in the monitored system environment 2102. A robust description of the design, function, operation, and features as may be usefully implemented in an SMS such as SPLUNK® IT SERVICE INTELLIGENCE™ is found in commonly owned U.S. Pat. No. 10,305,758 entitled, "SERVICE MONITORING INTERFACE REFLECTING BY-SERVICE MODE," issued on May 28, 2019, from U.S. patent application Ser. No. 15/713, 592, filed Sep. 22, 2017, which is hereby incorporated by reference in its entirety for all valid purposes. A reference SMS assuming many of the design, feature, and functionality aspects described in the foregoing patent application may usefully serve as an example SMS by which to illustrate the inventive disclosures herein. Accordingly, the foregoing patent application may be referred to herein as the reference SMS disclosure, and one of skill may wish to consider its contents in the entirety. More particularly, and not comprehensively, one of skill may wish to refer to specific content of the reference SMS disclosure for illumination of possible implementations and embodiments as regards specific topics as may arise in the discussion. Accordingly, a reference SMS comporting with the reference SMS disclosure is next briefly described and topical content is identified.

A reference SMS comporting with the reference SMS disclosure may use machine data ingested from the environment, maintained, and exposed for search processing by a data intake inquiry system (DIQS) as a principal input to its service monitoring functions. The reference SMS may represent an environment it monitors in terms of a related set of service, entity, and KPI definitions. An entity definition may represent a component in the operating environment and include information to identify machine data of the DIQS pertaining to the entity. A service definition may identify a service delivered by the monitored environment and may have an association with the one or more entity definitions that represent the operational entities that perform the service. A KPI definition may specify a search of machine data of the DIQS pertaining to the entities that perform a particular service to produce a value indicative of some measure of the particular service, perhaps a performance measure. Many KPI definitions may be associated with a particular service to produce measurements for different aspects of the service. While a KPI may be principally directed at the service, the measure of the KPI may also be produced for each of one or more of the entities that perform the service, in an embodiment. An embodiment may also produce other measures regarding individual entities. Additionally, an overall health score may be produced for the service to represent some measure of the health, goodness, wellness, desirability, or such, of the service on the whole.

In an embodiment, the health score of a service may be produced from the values for a number of its KPIs, perhaps all, substantially all, most, all active, all participating, or all selected of its KPIs, and may be designated in an embodiment as an aggregate KPI. The SMS may recognize and record notable events relative to the monitored environment based on criteria applied to machine data and its derivatives. Further, patterns may be recognized among the notable events indicating an incident or episode occurring in the IT environment worthy of increased attention or action for correction, resolution, remediation or such, and the notable events within the scope of the pattern may be recognized as a singular event group associated with and/or defining the recognized incident or episode.

In regards to architectural aspects of a reference SMS the reader may consider FIGS. 2-5 and the related discussion of the reference SMS disclosure, for example. In regards to entities and their definitions of a reference SMS the reader may consider FIGS. 6-10Z and the related discussion of the reference SMS disclosure, for example. In regards to services and their definitions of a reference SMS the reader may consider FIGS. 11-17C and the related discussion of the reference SMS disclosure, for example. In regards to KPIs and their definitions of a reference SMS the reader may consider FIGS. 19-27 and the related discussion of the reference SMS disclosure, for example. In regards to a state, condition, attribute, or such, associated with a KPI value in time via thresholding mechanisms to determine the severity states of example embodiments, the reader may consider FIGS. 28-31F and the related discussion of the reference SMS disclosure, for example. In regards to dependencies between and among services as may be represented by a service topology the reader may consider FIG. 34ZA2 and the related discussion of the reference SMS disclosure, for example. In regards to an urgency, weight, or importance value associated with the KPI of a reference SMS the reader may consider FIG. 29C (particularly 2962) and the related discussion of the reference SMS disclosure, for example. In regards to per-entity measures the reader may consider FIGS. 31E-31F and the related discussion of the reference SMS disclosure, for example. In regards to a service health score or aggregate KPI for a service of a reference SMS the reader may consider FIGS. 32-34A and the related discussion of the reference SMS disclosure, for example. In regards to notable event creation the reader may consider FIGS. 33B and 34O-34T and the related discussion of the reference SMS disclosure, for example. In regards to event groups, as related to the incidents and episodes herein, the reader may consider FIGS. 34ZD1-10 and 34ZE1-10 and the related discussion of the reference SMS disclosure, for example. In regards to a user interface display including parallel graph lanes for a common timeframe the reader may consider FIG. 54 (more broadly, FIGS. 50A-55A) and the related discussion of the reference SMS disclosure, for example. In regards to a user interface display including a layout of widgets which may serve as vehicles for the display of SMS data such as KPI values or health scores the reader may consider FIGS. 35-47C and the related discussion of the reference SMS disclosure, for example.

Again, the details depicted and discussed in relation to system 2100 of FIG. 21 are to aid in the further explanation and instruction of inventive aspects and should not be viewed as limiting their practice. Many variations and embodiments are possible. For example, while possibly discussed in one particular context or another, either one or both of data source systems 2140 and 2150 may be deployed "in the cloud" using a cloud platform provider such as Amazon Web Services (AWS), Microsoft Azure Cloud, and others. Either one or both of data source systems 2140 and 2150 may be located on the premises of the monitored IT system environment. Either one or both of data source systems 2140 and 2150 may be provided by a third party. Either one or both of data source systems 2140 and 2150 may be a service provider system. Either one or both of data source systems 2140 and 2150 may share a common sponsor/developer with the mobile application. Many combinations are clearly possible.

Figure 22:
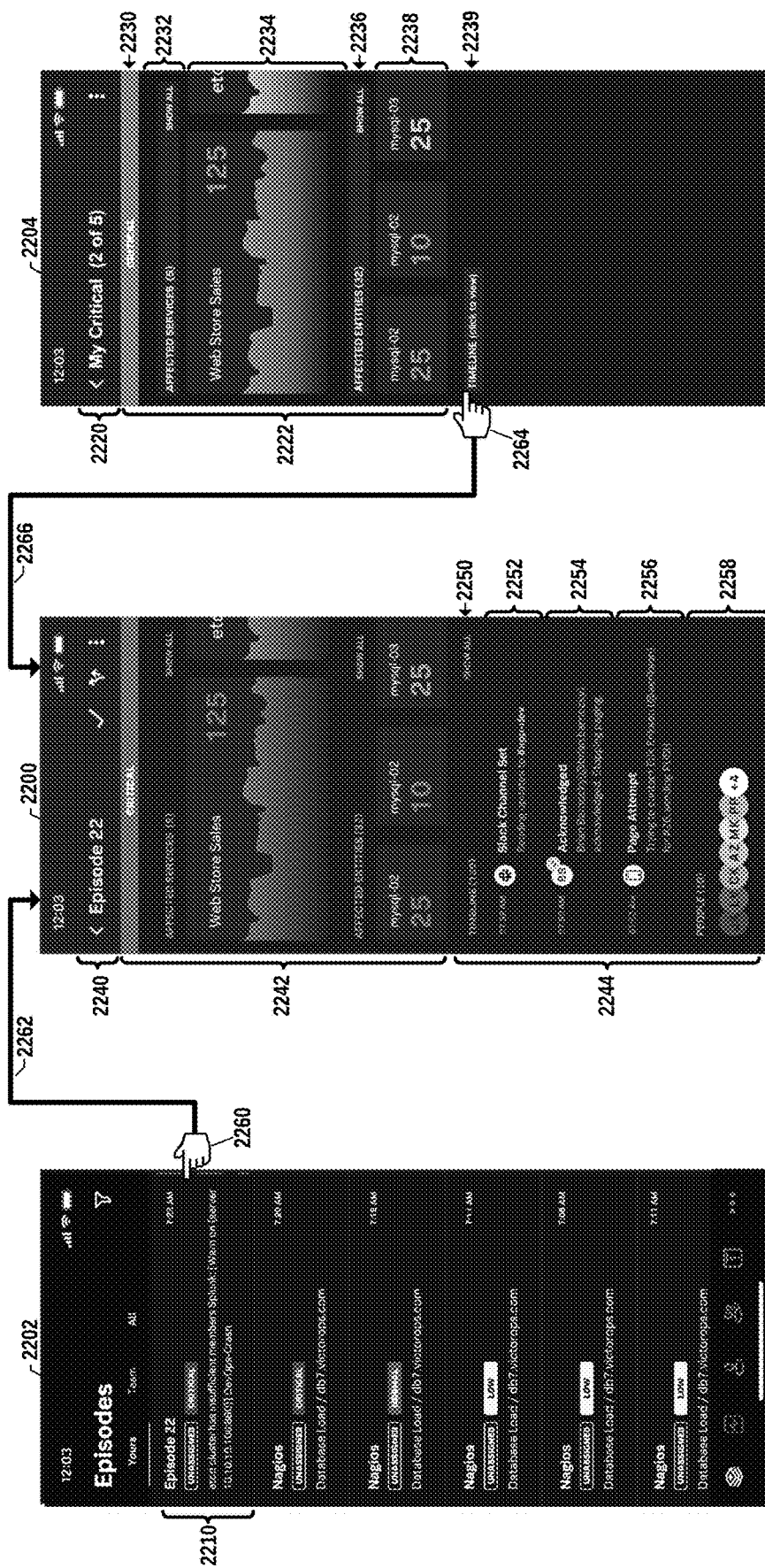
FIG. 22 depicts navigation among mobile application displays including a composite user interface display.

FIG. 22 depicts navigation among mobile application displays including a composite user interface display. The interfaces depicted in FIG. 22 continue with the incident management example, where a composite interface display of a mobile application may include a portion having information derived from data obtained by the mobile application from an incident management system and a portion having information derived from data obtained by the mobile application from a monitoring system such as a service monitoring system. The center interface display 2200 of FIG. 22, depicts an example of a composite incident interface as may be displayed by a mobile application used by service personnel, for example, while performing incident resolution. Each of interface displays 2202 and 2204 depict an example of an interface display of the mobile application as may be seen by a user prior to receiving composite interface display 2200.

Interface display 2202 depicts an example of an interface the mobile application makes available to a user that presents information derived from an incident management system. Interface display 2202 is entitled "Episodes" and presents a sequence of entries, each corresponding to some particular episode recognized by the incident management system. Entry 2210 is an example of the first entry in the list of episode entries. Episode entry 2210 is shown to include an identifier or descriptor for the episode, "Episode 22", a timestamp associated with the episode, "7:23 AM", an assignee indicator showing "UNASSIGNED", an urgency indicator showing "CRITICAL", and a short description of the episode, "etcd cluster has insufficient members Splunk: [Warn on {server 10.10.10.100: 880}] DevOps-Crash". Entry 2210 in its entirety is an interactive element or component of interface display 2202. User interaction with entry 2210 such as a finger press on the touchscreen in the area occupied by entry 2210 as indicated by 2260 causes an indication of the user interaction with entry 2210 to be signaled to and received by the mobile application. Arrow 2262 indicates that the programming logic of the mobile application is such that a user interaction with entry 2210 is a user request to cause navigation to composite interface display 2200 which presents additional information regarding the episode, Episode 22, represented by entry 2210. The episode related information presented by interface 2202 is derived from information obtained by the mobile application from the incident management system and absolutely excludes information obtained from the monitoring system.

In parallel fashion, to interface display 2202, interface display 2204 depicts an example of an interface the mobile application makes available to a user that presents information derived from the monitoring system—in the continuing example, an IT monitoring system such as the earlier described service monitoring system (SMS) of data source system 2150 of FIG. 21. Interface display 2204 is shown to include a header bar 2220 containing the text "My Critical (2 of 5)" indicating the information presented by interface 2204 relates to the second of five episodes that have a critical urgency and are assigned to or otherwise associated with the user of the mobile device. Interface display 2204 is shown to further include urgency status bar 2230 showing "CRITICAL", services section header 2232 indicating that five services are impacted or somehow implicated by the episode ("AFFECTED SERVICES (5)") and providing an interactive element ("SHOW ALL") enabling the user to signal the desire to see information related to all of the affected services. Interface display 2204 is shown to further include measures history section 2234 which contains a horizontally scrollable set of display tiles. A first tile component of interface 2204 is shown to include the name of the measure to which the tile corresponds ("Web Store Sales"), the current value of the measure ("125"), and a graphical visualization of the most recent historic values of the measure for some period of time, here shown as an area graph. In one embodiment, a tile component in the history section may correspond to a key performance indicator (KPI) of an affected service as determined by a service monitoring system (SMS), for example. The current value of the measure is thus the value of the KPI at the current or a recent point in time and the recent historic values are for the KPI over some period of time. An incomplete second tile is shown to the right side of the first tile component of interface 2204. Interface display 2204 is shown to further include entities section header 2236 indicating that 32 entities are impacted or somehow otherwise associated with the episode ("AFFECTED ENTITIES (32)") and providing an interactive element ("SHOW ALL") enabling the user to signal the desire to see information related to all of the affected entities. Interface display 2204 is shown to further include tile area 2238. Entity tile area 2238 is shown to include three tiles, one for each of the three different entities. Each entity tile of area 2238 includes the name of the entity represented by the tile and a current or most recent measurement value associated with the entity. In an embodiment, the color of measurement values in the entity tiles may be indicative of some aspect of the entity or its measurement, for example, the color may indicate a severity level, an importance level, a culpability level, a geographic region, or some other aspect. In an embodiment, other visual attributes such as font size, font style, or tile background, may be used to convey additional information. Many embodiments are possible. Interface display components 2230, 2232, 2234, 2236, and 2238, together make up critical episode entry 2222 of interface display 2204. Interface display 2204 is shown to further include interactive element 2239 showing "TIMELINE (click to view)" the presence and content (i.e., "Timeline") of which, in one embodiment, may have been determined somewhat by the mobile application based on information it obtained from the incident management system alerting it to the existence and availability of episode timeline data. Accordingly, interface display 2204 presents episode related information predominantly obtained from the monitoring system, and substantially excludes any display content derived from information obtained from the incident management system. An interface display may be said to substantially exclude content from a system where the items attributable to the system represent less than about one quarter of the data items included in the interface or occupy less than about one quarter of the display area of the interface. In any event, element 2239 is an interactive element or component of interface display 2204 and user interaction with element 2239, such as a finger press represented by 2264, causes an indication of user interaction with the element to be signaled to and received by the mobile application. Arrow 2266 indicates that the programming logic of the mobile application is such that a user interaction with element 2239 is a user request to cause navigation to composite interface display 2200 which presents additional information regarding the episode related to the information presented by interface 2204. The episode related information presented by interface 2204 is derived from information obtained by the mobile application from the monitoring system and substantially excludes information obtained from the incident management system.

Composite interface display 2200 is shown to include header portion 2240, monitoring system portion 2242, and incident management portion 2244. Header portion 2240 displays an identifier, descriptor, or other designator for the episode to which the composite interface display 2200 pertains ("Episode 22"). Monitoring system portion 2242 of composite interface display 2200 is shown to include the same informational presentation as critical episode entry 2222 of interface display 2204, already discussed and described. Incident management portion 2244 is shown to include timeline header 2250 identifying the timeline area ("TIMELINE") and indicating the current number of entries in the timeline for Episode 22 ("120"). Timeline header 2250 is shown to be followed by three timeline entries 2252, 2254, and 2256. Entry 2252, for example, is shown to include a timestamp ("07:32 AM"), an icon signifying a helpful aspect of the entry, here a depiction of the logo used by Slack Technologies in relation to its team collaboration software tools and services, a title or short description for the entry ("Slack Channel Set"), and additional detail or description information ("Sending updates to # app-dev"). Entries 2254 and 2256 each represent their respective timeline entry in similar fashion. Incident management portion 2244 is shown to further include parties section 2258 which is shown to include a title for the section ("PEOPLE"), a count of the total number of parties or contacts associated with the episode in the incident management system ("10"), and individual tokens representing each of the first six parties ("JK", "LV", "CK", "AZ", "MK", and "PP"), and an overflow token representing the additional parties and their count ("+4"). In an embodiment, and in accordance with the remainder of this disclosure, a composite interface display such as 2200 includes a portion 2242 populated with information derived from data obtained from one data source system via respective mobile network connection and a portion 2244 populated with information derived from data obtained from a different data source system via a different mobile network connection.

Figure 23:
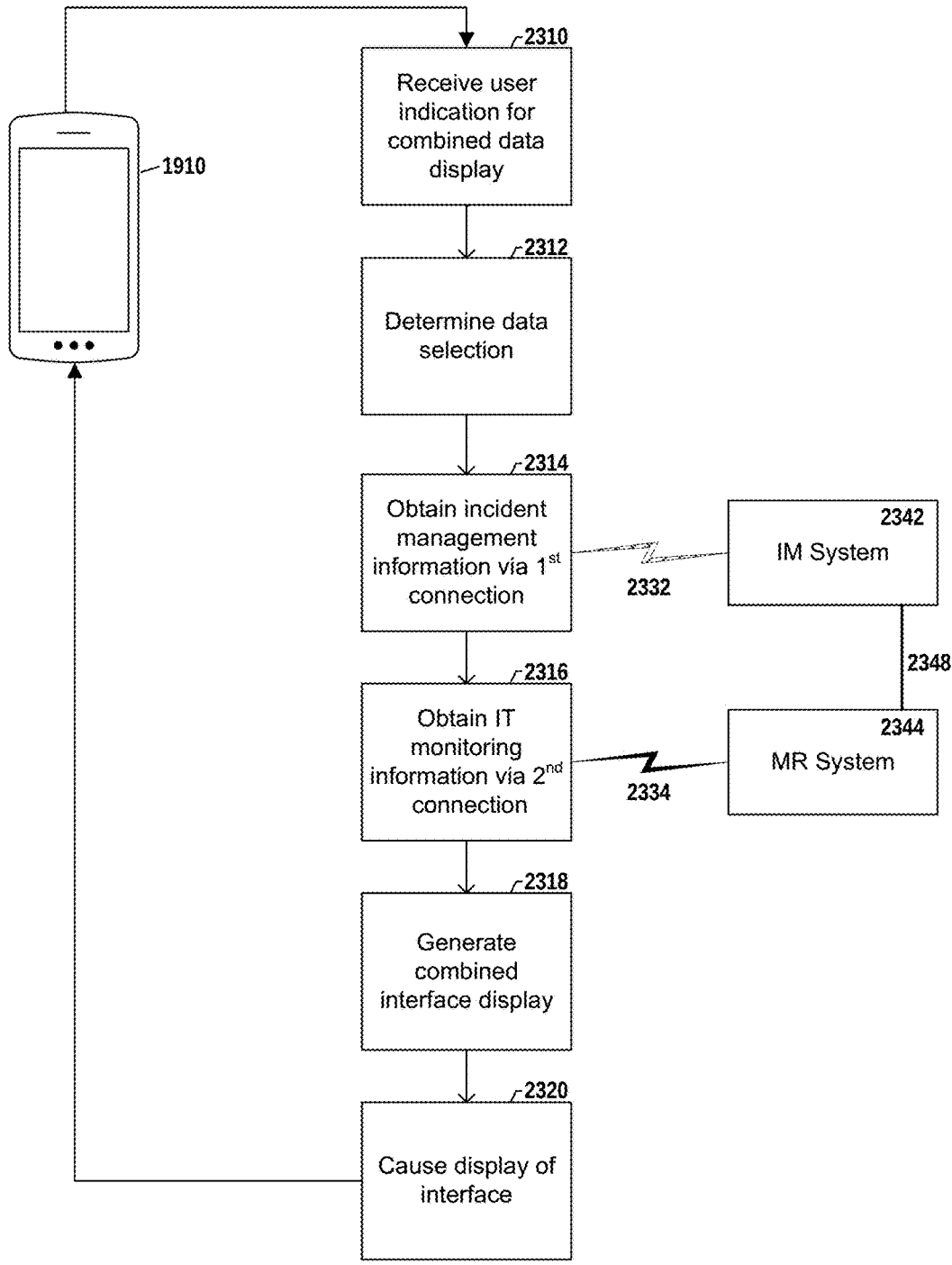
FIG. 23 depicts a system flowchart of a method that includes presenting a composite user interface display.

FIG. 23 depicts a system flowchart of a method that includes presenting a composite user interface display. Method 2300 of FIG. 23 is performed in one embodiment by a mobile application executing on a mobile computing device. At block 2310 the mobile application receives an indication that the user is requesting a composite interface display. Such processing was discussed in and about elements 2260 and 2264 of FIG. 22. At block 2312, the mobile application determines the selection of data needed, including data from each of a first system, and incident management system, and a second system, an IT monitoring or monitoring and reporting system, such as a service monitoring system (SMS). In one embodiment, determining the selection of needed data may include identifying various data item or element placeholders in a template or pattern for constructing the composite user interface display and associating each with the instance-specific source data items required to produce or populate each. In an embodiment, determining the selection of needed data may include identifying data values from one source that may be used to associate, correlate, specify, cross reference, or otherwise determine or identify related or relevant incident context information from another source. For example, an incident identifier received from an IMS may be used as a criterion in a search or selection of corresponding MS data in an embodiment where the MS and IMS by design or coordination effectively tag or otherwise associate incident information in their respective systems with a common identifier. As another example, a service identifier and incident time range information from an IMS may be used to conduct a generalized search of MS data related to that service and time period, and the search result could be further refined by looking for returned results that have indicia of usefulness for problem determination or resolution, in an embodiment. As another example, an entity identifier, error code, and timestamp already received from an MS may be used by the mobile application to locate a corresponding record in the IMS and with it all of the related information of the incident of the IMS of which it is a part. In one embodiment, the IMS may glean at the time it ingests an incident from the MS, information that hints or suggests search criteria to identify past and future data in the MS that may be subsequently mined or tagged for relevance to permit collaboration with greater context. Examples of such information may include component or entity identifiers, service identifiers, timestamps, building or location information, personnel identifiers, and countless others. One of skill appreciates by consideration of this disclosure the many mechanisms that could be employed to determine, identify, query, select, or such, data in one source system that correlates, corresponds, cross-references, or such, to data in another source system, for providing meaningful contextual information surrounding an incident.

At block 2314, the mobile application obtains information via first mobile network connection 2332 from an incident management system represented by block 2342. The information obtained includes at least as much information as needed and possible to supply or derive the incident management system data identified at block 2312. At block 2316, the mobile application obtains information via a second mobile network connection 2334 from a monitoring and reporting system, such as an SMS represented by block 2344. The information obtained includes at least as much information as needed and possible to supply or derive the monitoring and reporting system data identified at block 2312. Incident management system 2342 and monitoring reporting system 2344 are shown to be coupled by connection 2348. Connection 2348 may be a network connection and indicates that data, such as notable event data and/or episode descriptive data may be exchanged by systems 2342 and 2344 in order for each to perform its intended tasks, without involvement of, or facilitation by, the mobile network connections or the mobile computing application for the data exchange. As stated elsewhere and is generally true regarding methods, procedures, or processes described herein, operations may be performed in other orders or in parallel, and in other combinations and other embodiments, unless logic demands otherwise. Here too, the processing represented by blocks 2314 and 2316 may, in an iteration, have incidentally incurred before the processing of block 2312, and the processing of block 2312 may recognize that the entire selection of data needed is already available and sufficiently current. At block 2318, the mobile application generates the requested combined interface display using data determined at block 2312 and obtained at blocks 2314 and 2316. At block 2320, the mobile application causes the display of the interface display generated at block 2318 on the mobile computing device 1910. One of skill will appreciate that the operations just described for any of the blocks of method 2300 may be altered, augmented, adjusted, expanded, narrowed, or otherwise modified, at least in accordance with relevant discussion appearing throughout this written description and its figures.

4.0. Computing System Architecture

Figure 24:
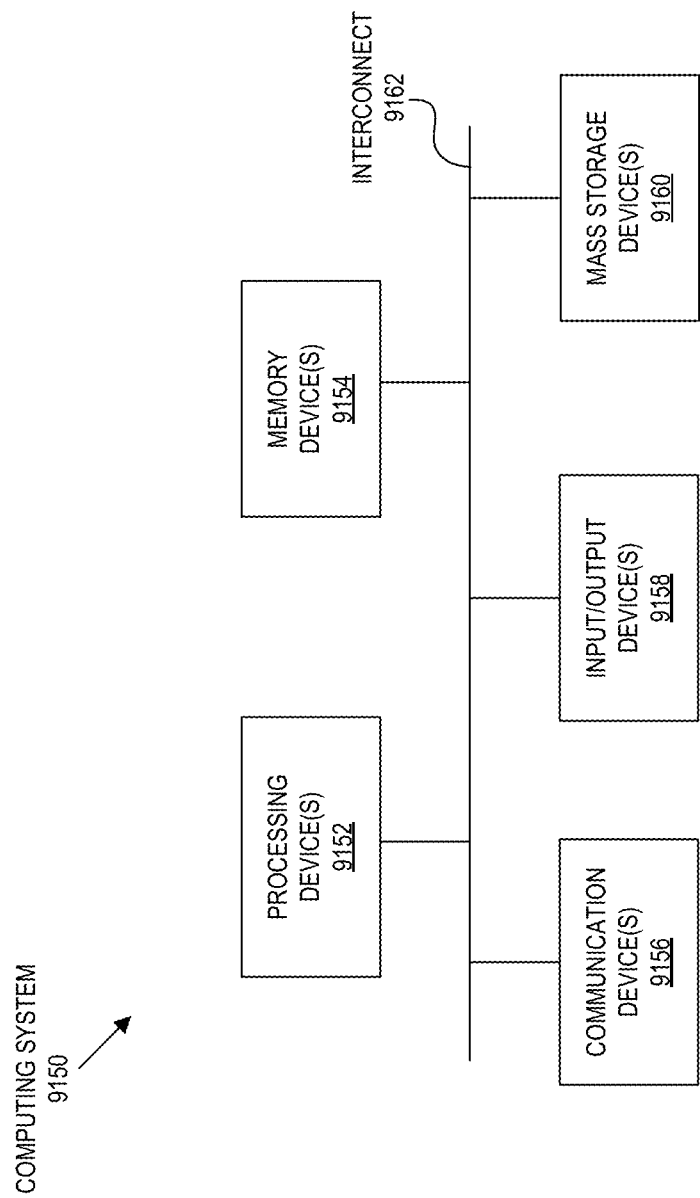
FIG. 24 is a block diagram illustrating a high-level example of a hardware architecture of a computing system in which an embodiment may be implemented.

FIG. 24 is a block diagram illustrating a high-level example of a hardware architecture of a computing system in which an embodiment may be implemented. For example, the hardware architecture of a computing system 9150 can be used to implement any one or more of the functional components described herein (e.g., metrics ingestion component 202, metrics catalog and search component 204, metrics analysis component 206, metrics sharing component 208, or metrics store component 210). The computing system 9150 can also be used to implement any of a forwarder, indexer, search head, data store, or a computing resource. In some embodiments, one or multiple instances of the computing system 9150 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 9150 includes one or more processing devices 9152, one or more memory devices 9154, one or more communication devices 9156, one or more input/output (I/O) devices 9158, and one or more mass storage devices 9160, all coupled to each other through an interconnect 9162.

The interconnect 9162 may be or include one or more conductive traces, buses, point-to-point connections, controllers, adapters, and/or other conventional connection devices. Each of the processing devices 9152 controls, at least in part, the overall operation of the processing of the computing system 9150 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 9154 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 9160 can be or include one or more hard drives, digital versatile disks (DVDs), flash memories, or the like. Each memory device 9154 and/or mass storage device 9160 can store (individually or collectively) data and instructions that configure the processing device(s) 9152 to execute operations to implement the techniques described above.

Processors suitable for the execution of a computer program include, by way of example, both general and special purpose microprocessors, and any one or more processors of any kind of digital computer (e.g., processing devices 452). Generally, a processor will receive instructions and data from a read-only memory or a random access memory or both. The essential elements of a computer are a processor for performing instructions and one or more memory devices for storing instructions and data. Generally, the computer system 9150 will also include, or be operatively coupled to receive data from or transfer data to, or both, one or more mass storage devices for storing data, e.g., magnetic, magneto optical disks, or optical disks. However, a computer need not have such devices.

Each communication device 9156 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 9152, each I/O device 9158 can be or include a device such as a display (which may be a touch screen display), audio speaker, keyboard, mouse or other pointing device, microphone, camera, etc. Note, however, that such I/O devices 9158 may be unnecessary if the processing device 9152 is embodied solely as a server computer.

The computing system 9150 can include clients or servers. A client and server are generally remote from each other and typically interact through a communication network. The relationship of client and server arises by virtue of computer programs running on the respective computers and having a client-server relationship to each other. In the case of a client device, the communication devices(s) 9156 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 9156 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 454). A processor (e.g., processing device(s) 452) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 9152), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 9154).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 9150 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 452) and the memory (e.g., memory device 9154) can be supplemented by, or incorporated in, special purpose logic circuitry.

To provide for interaction with a user, architecture provider or reviewer, embodiments of the subject matter described in this specification can be implemented with a display device of the I/O devices 9158, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 9158 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 9150 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

5.0. Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Similarly, various components of the illustrated systems can be implemented in other virtualization constructs, such as one or more containers (operating-system-level virtualizations) within a containerization framework like Docker by Docker, Inc., perhaps facilitated with a container orchestration facility like the open source Kubernetes, both widely known. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed:

1. A computer-implemented method comprising:
   receiving, at a mobile application executing on a mobile computing platform, an indication of user input requesting presentation of a composite information display for an information technology (IT) incident, wherein the mobile application is provided to the mobile computing device by an operator of a first computing system via an application distribution system;
   receiving, at the mobile application, first information related to the IT incident transmitted by the first computing system;
   receiving, at the mobile application, second information related to the IT incident transmitted by a second computing system not a part of the first computing system;

causing the presentation of the composite information display by the mobile computing platform, the composite information display including information derived at least in part from the first information and derived at least in part from the second information;

wherein the first computing system is coupled to the second computer system via a network for the transmission of notable event and/or incident descriptive information independently of the mobile application and the mobile computing platform.

2. The method of claim 1 wherein the first information is received via a first mobile network connection, and wherein the second information is received via a second mobile network connection different from the first mobile network connection.

3. The method of claim 1 wherein the first computing system is an incident management system (IMS), and wherein the second computing system is an information technology monitoring system (ITMS).

4. The method of claim 1 wherein the first computing system is an incident management system (IMS), wherein the second computing system is an information technology monitoring system (ITMS), and wherein the second computing system transmits notable event data via the network to the first computing system.

5. The method of claim 1 wherein the first computing system is an incident management system (IMS), wherein the second computing system is an information technology monitoring system (ITMS), and wherein the second computing system determines the IT incident, in the first instance, and transmits information associated with the IT incident via the network to the first computing system.

6. The method of claim 1 wherein the first computing system is an incident management system (IMS), wherein the second computing system is an information technology monitoring system (ITMS), wherein the second computing system determines the IT incident and transmits information associated with the IT incident via the network to the first computing system, the information associated with the IT incident including an incident identifier and information regarding one or more notable events associated with the IT incident.

7. The method of claim 1 wherein the first computing system is an incident management system (IMS), wherein the second computing system is an information technology monitoring system (ITMS), wherein the second computing system transmits notable event data via the network to the first computing system, and wherein the first computing system determines the IT incident, in the first instance, based at least in part on the notable event data.

8. The method of claim 1 wherein the first computing system is an incident management system (IMS), wherein the second computing system is an information technology monitoring system (ITMS) for an IT environment, wherein the second computing system determines notable event data representing one or more notable events based at least in part on one or more searches of machine data from a plurality of sources reflecting operation of the IT environment and transmits the notable event data via the network to the first computing system, and wherein the first computing system determines the IT incident, in the first instance, based at least in part on the notable event data.

9. The method of claim 1 wherein at least one from among the first computing system and the second computing system is a service provider system providing services over network connections to subscriber devices.

10. The method of claim 1 wherein one from among the first computing system and the second computing system is a service provider system providing services over network connections to subscriber devices, and wherein the mobile application is provided to the mobile computing device by the operator of the service provider system via an application distribution system.

11. The method of claim 1 wherein one from among the first computing system and the second computing system is a non-subscriber system not providing services over network connections to subscriber devices; and wherein the mobile application is provided to the mobile computing device by the operator of the non-subscriber system via an application distribution system.

12. The method of claim 1 wherein the receiving of at least one from among the first information and the second information includes receiving over a mobile network connection including a mobile interface facility.

13. The method of claim 1 wherein the receiving of at least one from among the first information and the second information includes receiving over a mobile network connection including a mobile interface facility, the mobile interface facility including a message broker component.

14. The method of claim 1 wherein the receiving of at least one from among the first information and the second information includes receiving over a mobile network connection including a mobile interface facility, the mobile interface facility having a message broker component performing endpoint validation.

15. The method of claim 1 wherein the first computing system is an incident management system (IMS), and wherein the first information related to the IT incident includes an authoritative description of the IT incident.

16. The method of claim 1 wherein the first computing system is an incident management system (IMS), and wherein the first information related to the IT incident includes an authoritative description of the IT incident including an identifier of the IT incident.

17. The method of claim 1 wherein the first computing system is an incident management system (IMS), and wherein the first information related to the IT incident includes timeline information associated with the IT incident.

18. The method of claim 1 wherein the first computing system is an incident management system (IMS), and wherein the first information related to the IT incident includes information regarding one or more persons associated with the IT incident.

19. The method of claim 1 wherein the second computing system is an information technology monitoring system (ITMS), and wherein the second information related to the IT incident includes information regarding the performance of one or more services associated with the IT incident.

20. The method of claim 1 where the second computing system is an information technology monitoring system (ITMS), wherein an IT environment is monitored by the ITMS, and wherein the second information related to the IT incident includes information regarding one or more entities of the IT environment associated with the IT incident.

21. The method of claim 1 wherein the first computing system is an incident management system (IMS), wherein the first information related to the IT incident includes timeline information associated with the IT incident, wherein the second computing system is an information technology monitoring system (ITMS), and wherein the second information related to the IT incident includes information regarding the performance of one or more services associated with the IT incident.

22. The method of claim 1 wherein the operator of the first computing system is different than the operator of the second computing system.

23. The method of claim 1 wherein the operator of the first computing system is different than the operator of the second computing system, and wherein the operator of the first computing system provides the mobile application to the mobile computing device via an application distribution system.

24. A system comprising:
a memory; and
a processing device coupled with the memory to perform operations comprising:
receiving, at a mobile application executing on a mobile computing platform, an indication of user input requesting presentation of a composite information display for an information technology (IT) incident, wherein the mobile application is provided to the mobile computing device by an operator of a first computing system via an application distribution system;
receiving, at the mobile application, first information related to the IT incident transmitted by the first computing system;
receiving, at the mobile application, second information related to the IT incident transmitted by a second computing system not a part of the first computing system;
causing the presentation of the composite information display by the mobile computing platform, the composite information display including information derived at least in part from the first information and derived at least in part from the second information;
wherein the first computing system is coupled to the second computer system via a network for the transmission of notable event and/or incident descriptive information independently of the mobile application and the mobile computing platform.

25. The system of claim 24 wherein the first information is received via a first mobile network connection, and wherein the second information is received via a second mobile network connection different from the first mobile network connection.

26. The system of claim 24 wherein the first computing system is an incident management system (IMS), wherein the second computing system is an information technology monitoring system (ITMS), and wherein the second computing system transmits notable event data via the network to the first computing system.

27. The system of claim 24 wherein the first computing system is an incident management system (IMS), wherein the second computing system is an information technology monitoring system (ITMS), and wherein the second computing system determines the IT incident, in the first instance, and transmits information associated with the IT incident via the network to the first computing system.

28. The system of claim 24 wherein the first computing system is an incident management system (IMS), wherein the second computing system is an information technology monitoring system (ITMS), wherein the second computing system transmits notable event data via the network to the first computing system, and wherein the first computing system determines the IT incident, in the first instance, based at least in part on the notable event data.

29. The system of claim 24 wherein the receiving of at least one from among the first information and the second information includes receiving over a mobile network connection including a mobile interface facility, the mobile interface facility including a message broker component.

30. A non-transitory computer readable storage medium encoding instructions thereon that, in response to execution by one or more processing devices, cause the one or more processing devices to perform operations comprising:
receiving, at a mobile application executing on a mobile computing platform, an indication of user input requesting presentation of a composite information display for an information technology (IT) incident, wherein the mobile application is provided to the mobile computing device by an operator of a first computing system via an application distribution system;
receiving, at the mobile application, first information related to the IT incident transmitted by the first computing system;
receiving, at the mobile application, second information related to the IT incident transmitted by a second computing system not a part of the first computing system;
causing the presentation of the composite information display by the mobile computing platform, the composite information display including information derived at least in part from the first information and derived at least in part from the second information;
wherein the first computing system is coupled to the second computer system via a network for the transmission of notable event and/or incident descriptive information independently of the mobile application and the mobile computing platform.

* * * * *